INVENTOR:
JOHN J. SEARLES
ATTORNEYS

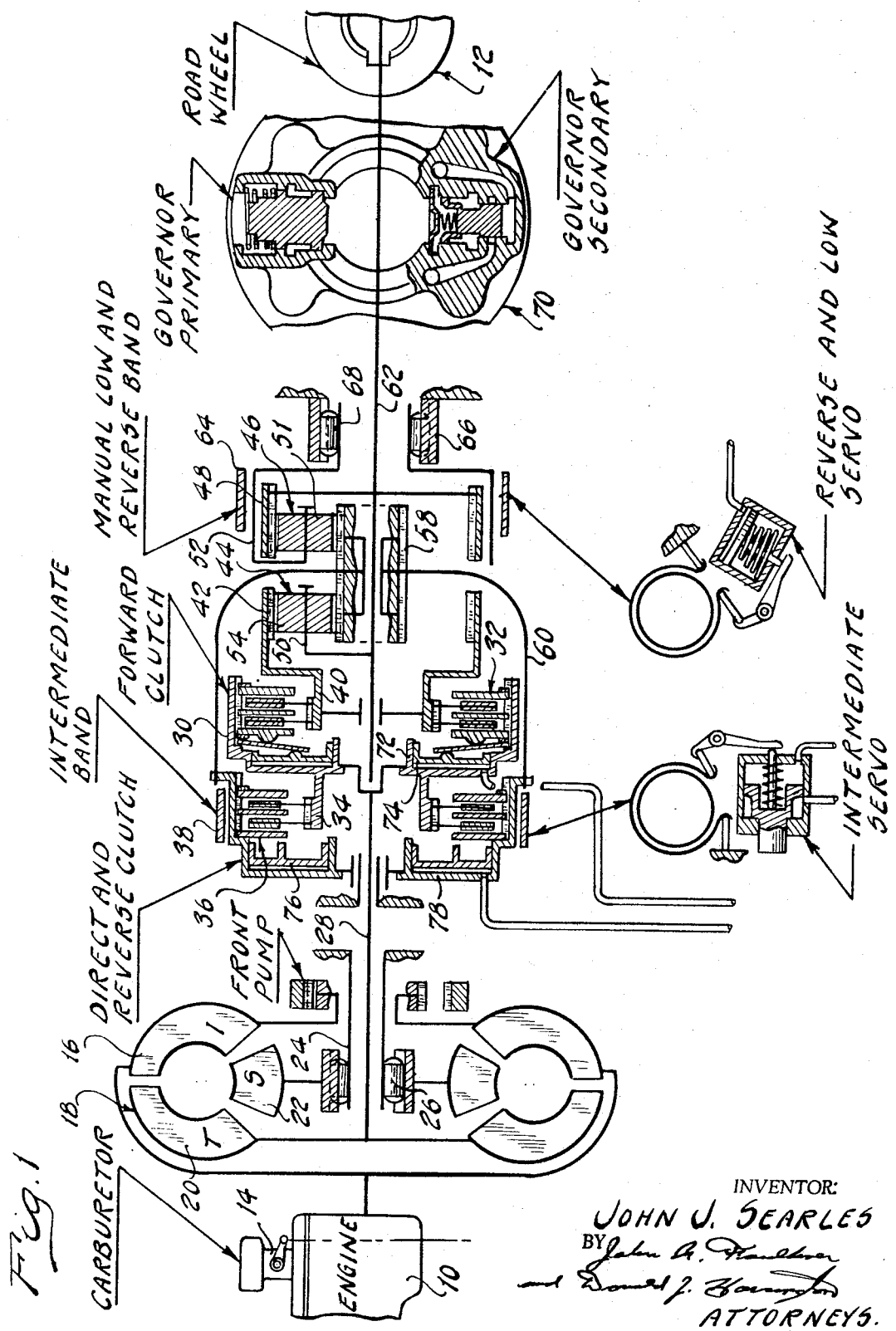

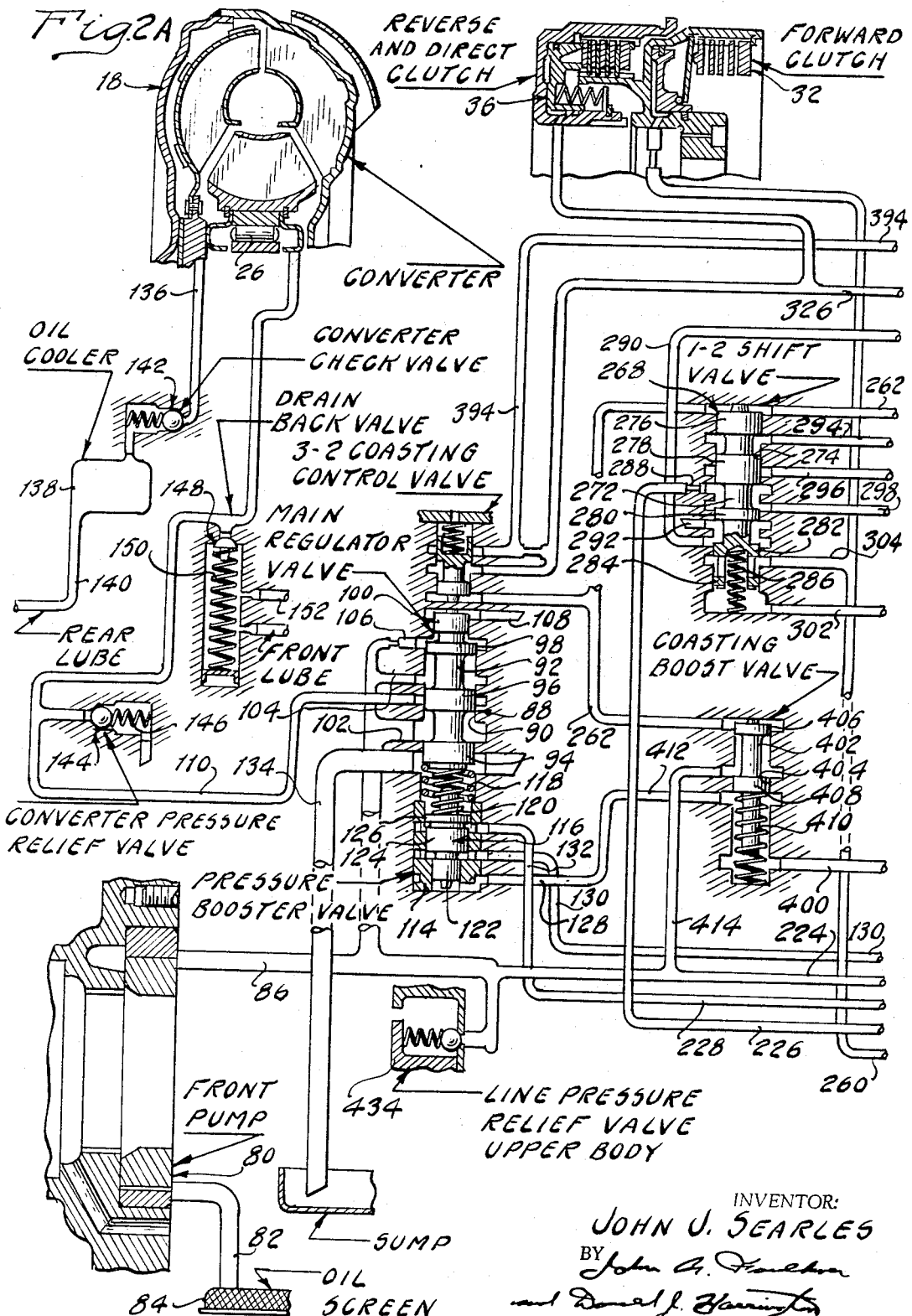

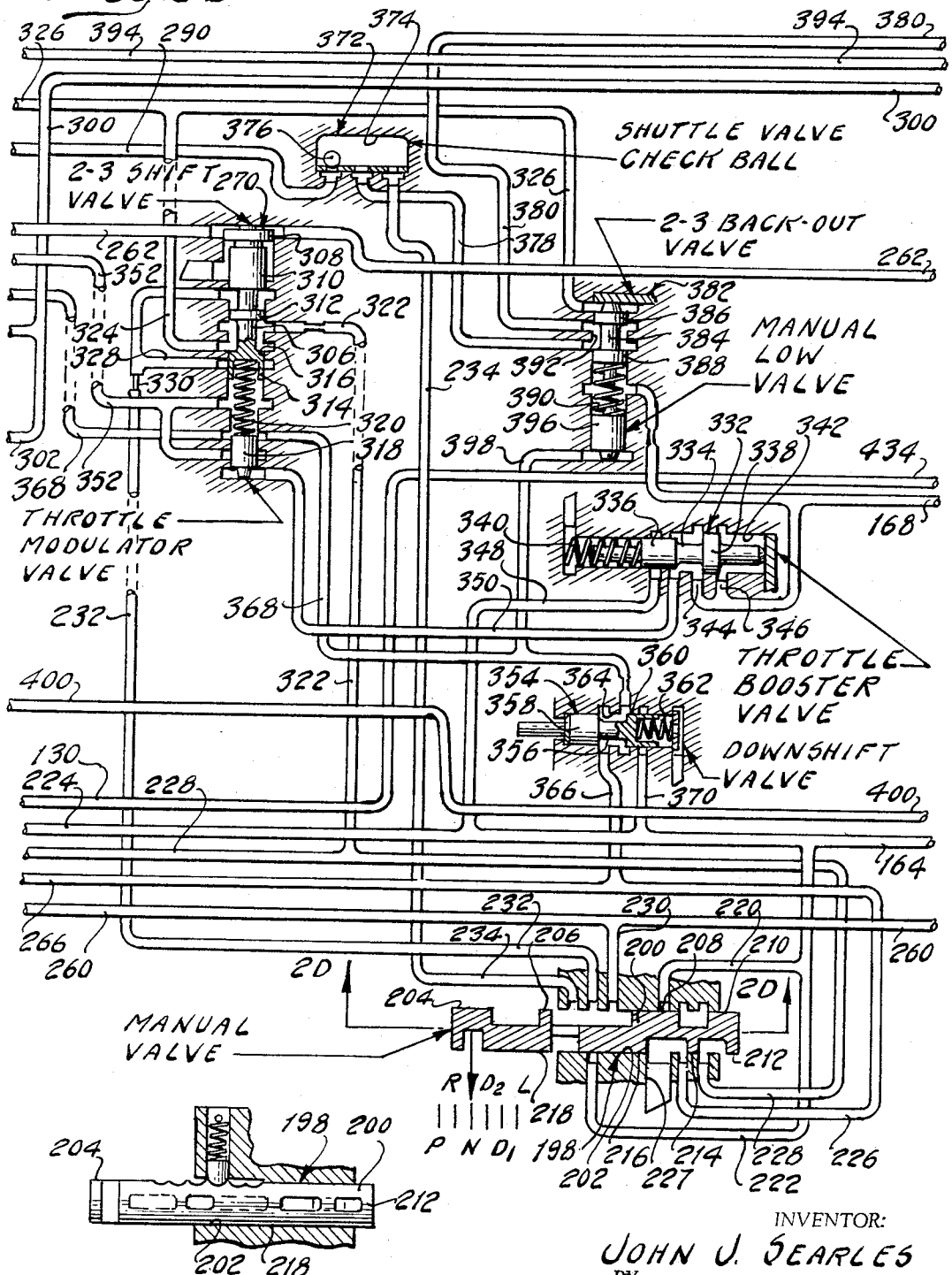

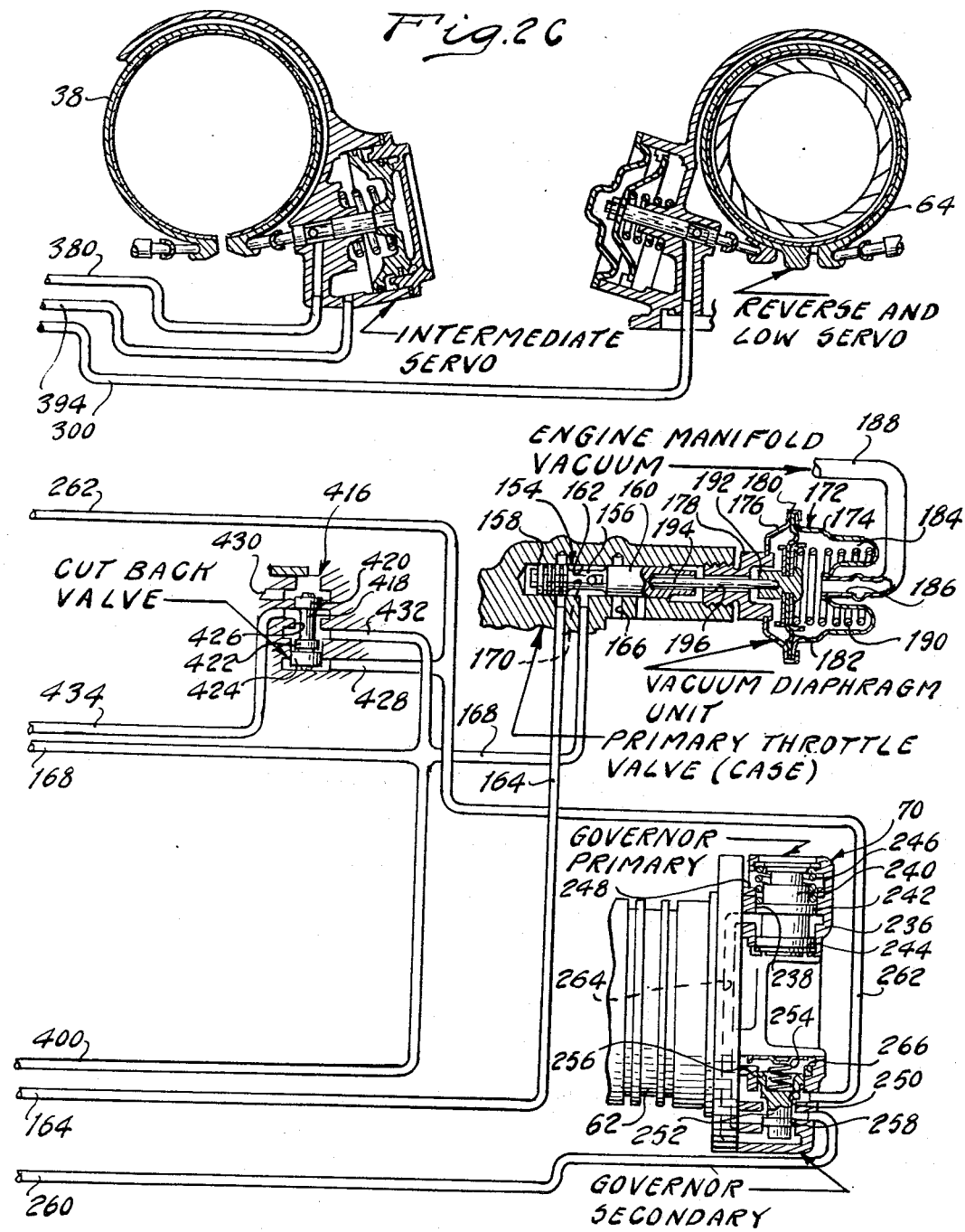

United States Patent Office
3,327,554
Patented June 27, 1967

3,327,554
AUTOMATIC CONTROL SYSTEM FOR A MULTIPLE SPEED RATIO POWER TRANSMISSION MECHANISM
John J. Searles, Garden City, Mich., assignor to Ford Motor Company, Dearborn, Mich., a corporation of Delaware
Filed Sept. 21, 1964, Ser. No. 397,798
24 Claims. (Cl. 74—472)

My invention relates generally to multiple speed ratio automatic power transmission systems and to improvements in a control system for a multiple speed ratio power transmission system that is adapted for use in an automotive vehicle driveline. It relates more particularly to an improved means for controlling pressure distribution to pressure sensitive servos in such a system and for controlling the operating pressure level of the servos.

The improvements of my invention can be applied readily to a transmission control system of the type disclosed in copending application Ser. No. 277,855, which is assigned to the assignee of my instant invention. Reference may be had to that application for the purpose of supplementing this disclosure.

A multiple speed-ratio power transmission mechanism for an automotive vehicle driveline of the type with which I now am concerned includes a hydrokinetic torque converter mechanism and planetary gearing capable of delivering turbine torque from a torque converter mechanism to a turbine member which in turn is connected to the vehicle traction wheels through a suitable drive shaft and differential and axle assembly. The relative motion of the elements of the gearing is controlled by friction clutches and brakes to establish three forward driving speed ratios and a single reverse drive speed ratio. The clutches and brakes are operated by means of fluid pressure sensitive servos, and the pressure source for the servos is in the form of a positive displacement pump that is connected drivably to the vehicle engine, which in this case is a throttle-controlled internal combustion engine. Pressure distribution from the pressure source to the servos is controlled by an automatic valve system that is sensitive to engine manifold pressure and the driven speed to produce automatic speed ratio changes in the driveline is conditioned for any driving condition that may be experienced.

The operating pressure level is maintained by a regulator valve system that functions to maintain adequate torque transmitting capacity in the friction clutches or brakes. The valve system responds to changes in manifold pressure in the intake manifold system of the vehicle engine to provide an increased control pressure for the servos when the torque transmitting requirements are high.

I contemplate that the torque that must be accommodated by the elements of the gearing will decrease as the speed ratio of the transmission system increases. This is due to the fact the hydrokinetic torque converter provides a torque ratio that decreases in magnitude rather quickly as the converter speed ratio increases. An increase in converter speed ratio, of course, is accompanied by an increased vehicle speed for any given speed ratio of the gearing. I therefore have made provision for reducing the magnitude of the operating pressure level of the regulator valve system as the vehicle speed increases to a predetermined value for any given engine manifold pressure. The provision of a system of this type is a principal object of my invention.

It is a further object of my invention to provide a regulator valve system having a road-speed sensitive, control pressure cutback feature wherein provision is made for increasing the road speed at which a pressure reduction is experienced as the manifold pressure of the engine is increased. In this way, the optimum torque transmitting capacity of the clutch and brake servos is maintained at a more appropriate value that reflects the actual torque transmitting capacity for any given driving condition.

It is a further object of my invention to provide a regulator valve system for use in an automatic control valve circuit for an automotive vehicle driveline wherein provision is made for rendering the regulator valve system in the circuit insensitive to changes in engine manifold pressure when the magnitude of the engine manifold pressure is less than a predetermined value. In this way a minimum control pressure for the servos is maintained, thus assuring that the torque transmitting capacity will be maintained at a value that is sufficient to prevent slippage of the associated friction surfaces of the clutches and brakes.

In the improved control valve system of my invention, I have provided a throttle valve mechanism that responds to engine manifold pressure to produce a pressure signal that is related in magnitude to the engine manifold pressure. This pressure signal is utilized by the regulator valve system in the manner previously described to render the same insensitive to changes in engine torque. The same signal is utilized also by pressure distributor valves that control distribution of pressure from the pressure source to the various servos to initiate speed ratio changes in the gearing. The pressure distributor valves respond also to a pressure signal provided by a governor valve mechanism that responds to changes in the speed of the driven member.

It is an object of my invention to provide a control system having pressure distributor valves and a pressure regulator valve system of the type above set forth wherein the regulator valve system can be calibrated independently of the variables that affect the calibration of the distributor valves. Thus the proper shift points for any given driving condition can be established without upsetting the calibration of the regulator valve system notwithstanding the fact that both the shift valves and the regulator valve system respond to the same engine torque sensitive pressure signal.

It is a further object of my invention to provide a means for increasing the regulated pressure level during coasting operation of the vehicle with a minimum engine throttle setting, whereby adequate torque transmitting capacity in the servos is maintained to permit engine braking. I contemplate that this boost in control pressure under coasting conditions will be obtained by reason of a boost valve mechanism that operates to overrule the engine torque sensitive pressure signal acting upon the regulator valve system when the vehicle speed is high and the torque sensitive pressure signal is at a minimum value.

These features as well as others will become readily apparent from the following description and from the accompanying drawings, wherein:

FIGURE 1 shows in schematic form the torque transmitting components of the transmission mechanism;

FIGURES 2A, 2B and 2C show in schematic form a valve system for controlling the operation of the fluid pressure operated servos illustrated schematically in FIGURE 1;

FIGURE 2D is a detail view of the manual valve of FIGURE 2B, and is taken along the plane of section line 2D—2D;

Figure 3:
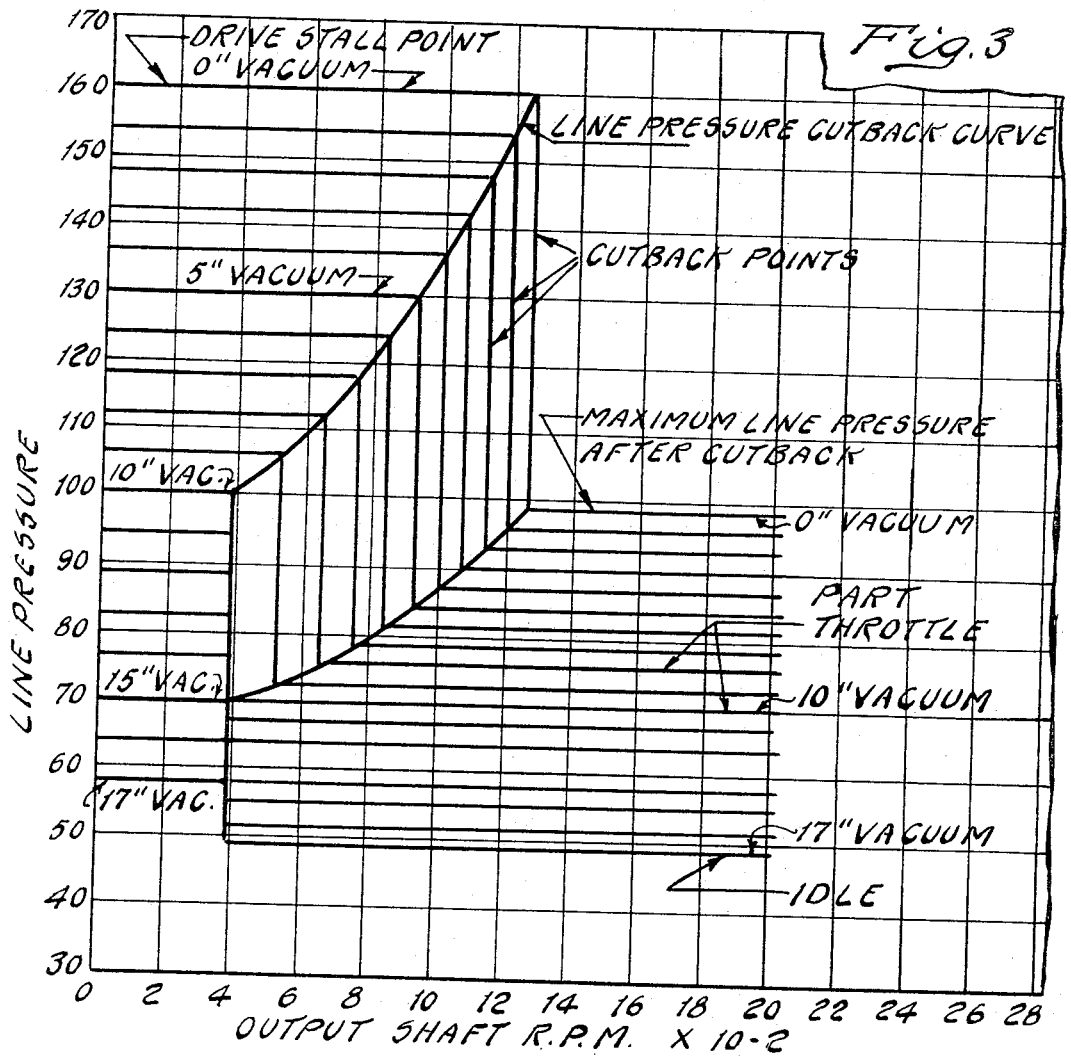
FIGURE 3 shows the relationship of the vehicle speed sensitive pressure signal and the vehicle speed itself.

Referring first to FIGURE 1, the driveline includes an internal combustion vehicle engine 10 and road wheels 12. The engine 10 is provided with an air-fuel mixture intake manifold system 14.

The crankshaft of the engine is connected to an impeller 16 for a hydrokinetic torque converter unit 18. This unit includes also a turbine 20 and a stator 22 which cooperate with the impeller 16 to define a toroidal fluid flow path.

The stator 22 is mounted upon a stationary sleeve shaft 24 which is connected in turn to a stationary housing portion of the transmission mechanism. An overrunning brake 26 inhibits rotation of the bladed stator 22 in a direction opposite to the direction of rotation of the impeller although it accommodates freewheeling motion of the stator 22 in the opposite direction.

The engine torque delivered to the impeller establishes toroidal, fluid circulation in the converter torus circuit. The change in the moment of momentum of the converter fluid, as it traverses the bladed path of the turbine 20, creates a turbine torque that is distributed to a turbine shaft 28. The bladed stator 22 functions in the usual fashion to change the direction of the tangential component of the absolute fluid flow velocity vector in the torus circuit thereby permitting a hydrokinetic torque multiplication to occur at any converter speed-ratio less than the speed-ratio at which the stator 22 overruns brake 30.

Turbine torque acting upon shaft 28 is distributed to a forward drive clutch element 30 which forms a part of a selectively engageable clutch 32. Element 30 includes also a portion 34 that forms a part of a direct and reverse clutch 36. This clutch includes a clutch drum about which is positioned a brake band 38 that may be applied and released by means of a suitable fluid pressure operated intermediate servo.

Forward clutch 32 includes an element 40 that is connected to a ring gear 42 for a first planetary gear unit 44. A second planetary gear unit 46 includes a ring gear 48 which is connected drivably to carrier 50 for the first planetary gear unit 44. A corresponding carrier 52 for the gear unit 46 has rotatably journaled thereon planetary pinions 51. In a similar fashion pinions 54 are journaled rotatably upon carrier 50.

A common sun gear 58 engages each set of planet pinions 51 and 54. It is connected drivably to the clutch drum for the direct and reverse clutch 36 by means of a drive shell 60. Both carriers 50 and 52 are connected drivably to the power output shaft 62.

A manual low and reverse brake band 64 surrounds a brake drum that defines in part the carrier 52. This brake drum is anchored against a stationary housing portion by means of an overrunning brake that comprises a cammed outer race 66 and an inner race that forms a part of the carrier 52. Overrunning brake elements in the form of rollers 68 are situated between the races, and they cooperate with the cammed surfaces of the race 66 to inhibit rotation of the carrier 52 in one direction and to prevent motion thereof in the opposite direction. The brake 54, on the other hand, inhibits rotation of the carrier 52 in either direction, but primarily in the aforesaid opposite direction.

A two-stage governor valve mechanism 70 is drivably connected to the power output shaft 62. This mechanism forms a part of the automatic control valve system that will be described with reference to FIGURES 2A, 2B and 2C.

A positive displacement front pump is drivably connected to the impeller as indicated in FIGURE 1. This pump also forms a part of the automatic control valve system that will be described subsequently.

Clutch element 30 defines an annular cylinder 72 within which is situated an annular piston 74. This piston and cylinder cooperate to define a clutch pressure chamber that may be pressurized selectively to engage and disengage the forward clutch 32.

In a similar fashion an annular cylinder 78 is defined by the clutch drum of the direct and reverse clutch 36. Situated in this cylinder is an annular piston 76. This piston and cylinder cooperate to define a pressure cavity that may be pressurized selectively to engage and disengage the clutch 36.

A reverse and low rear servo is provided as indicated, to apply and release the brake band 64. In a similar fashion the intermediate front servo shown in FIGURE 1 is provided for applying and releasing brake band 38.

To establish forward drive operation in the lowest speed-ratio, it merely is necessary to engage the forward clutch 32. Turbine torque then is delivered directly through the clutch 32 to the ring gear 42. This causes sun gear 58 to rotate in a direction opposite to the direction of rotation of the ring gear 42. The resulting torque of the carrier 50, however, is transferred directly to the power output shaft 62.

The reverse motion of the sun gear 58 causes forward driving motion of the ring gear 48. The torque distributed to the ring gear 48 is transferred directly to the power output shaft 62 while carrier 52 acts as a reaction member for the system. Carrier 52 is anchored against the transmission housing by the overrunning brake shown in part at 68. Thus a split torque delivery path is provided through the gearing.

To establish intermediate speed-ratio operation it merely is necessary to apply brake band 38 while the forward clutch 32 remains applied. This anchors the sun gear 58 thereby permitting it to function as a reaction element. The driven speed of the carrier 50 then is increased relative to the speed of the shaft 28. The overrunning brake shown in part at 68 overruns under these conditions. Thus the gear unit 46 performs no function as all the torque multiplication occurs in the gear unit 44.

High speed-ratio, direct drive operation is accomplished by engaging both of the clutches 32 and 36 and releasing the brake band 38. This locks together the sun gear 58 and the ring gear 42. All of the elements of the gear system thus rotate together in unison as a direct drive condition is established.

Brake band 64 can be applied to prevent overrunning motion of the brake shown in part at 68. The control system can be conditioned to prevent automatic upshifting tendencies so that the transmission mechanism will be caused to operate continuously in a lower speed ratio if the driver elects to apply the brake 64 while the forward clutch is applied.

To establish reverse drive operation, brake band 64 and clutch 36 are applied while clutch 32 and brake band 38 are released. Turbine torque then is delivered through shaft 28 to the sun gear 58. The clutch 36 and the drive shell 60 accommodate the turbine torque transfer. Carrier 52 acts as a reaction member since it is anchored by brake band 64. Ring gear 48 then is driven in a direction opposite to the direction of rotation of the shaft 28 and at a reduced speed ratio. Power output shaft 62, of course, is driven by ring gear 48.

In FIGURES 2A, 2B and 2C, I have illustrated in schematic form a control circuit for controlling the operation of the clutches and brakes of the transmission structure of FIGURE 1. The pump of FIGURE 1 is identified in FIGURE 2A by reference character 80. It includes a low pressure fluid intake passage 82 that communicates with an oil screen 84 located in the transmission sump that is located in the lower region of the transmission housing. The pump discharge passage for the pump 80 is shown at 86. It communicates with the various valves of the system which are situated in and partly define conduit structure extending from the pump 80 to each of the clutch and brake servos.

The operating pressure level for the pump 80 is maintained at a desired value by a main regulator valve 88. This valve includes a valve bore 90 within which is slidably positioned a multiple land valve spool 92 which is formed with external valve lands 94, 96, 98 and 100. Each of these lands registers with a cooperating internal valve land formed in the bore 90.

Passage 86 communicates with a valve bore 90 through the three branch passages 102, 104 and 106. Branch passage 102 communicates with the bore 90 at a location intermediate valve lands 94 and 96. Branch passage 104 communicates with the valve bore 90 at a location intermediate valve lands 96 and 98. Branch passage 106 communicates with the valve bore 90 at a location intermediate valve lands 98 and 100. A differential area is defined by the adjacent lands 98 and 100 as indicated. The upper end of bore 90 is exhausted through an exhaust port 108.

A converter feed passage 110 communicates with the bore 90 at a location directly adjacent land 96.

Located in a relatively large diameter portion of the bore 90 is a stationary valve sleeve 114 within which is slidably positioned a booster valve element 116. A first compression spring 118 is disposed between the valve spool 92 and the sleeve 114. A second compression spring 120 situated concentrically with respect to spring 118 acts between spool 92 and valve element 116. The combined spring force of the springs 118 and 120 urges valve spool 92 upwardly, as viewed in FIGURE 2A, and this force is opposed by the fluid pressure force in passage 86 which acts upon the differential area of lands 100 and 98.

Valve element 116 includes three valve lands 122, 124 and 126. The diameter of land 126 is greater than the diameter of land 124, and the latter diameter is greater than the diameter of land 122. A passage 128 is in fluid communication with the lower end of land 122 through a suitable port formed in sleeve 114. In a similar fashion a differential area defined by lands 122 and 124 is in fluid communication with a passage 130 through a port in sleeve 114. Also a differential area defined by lands 124 and 126 is in fluid communication with a passage 132 through a port in sleeve 114.

A low pressure oil return passage 134 communicates with the bore 90 at a location adjacent land 94.

When the engine 10 is operating the pump 80 develops a pressure in passage 86. This pressure is distributed to a differential area defined by lands 98 and 100. The spool 92 therefore tends to be urged downwardly as the pressure in passage 86 continues to increase. Passage 110 becomes uncovered by land 96. When this occurs pressure is distributed from passage 86 and through branch passage 104 to the passage 110, the latter extending to the inner torus region of the torque converter 18.

A flow return passage extends from the converter 18 as shown at 136. This passage communicates with an oil cooler 138, and the output flow of the cooler 138 is distributed to the lubrication points for the transmission gearing, a lubrication oil flow passage being indicated schematically in FIGURE 2A by numeral 140. The fluid then is returned to the transmission sump in the lower region of the transmission housing and it ultimately finds its way to the intake passage 82 for the pump 80. It again is recirculated through the circuit. A one-way flow check valve 142 situated in passage 136 permits flow from the converter to the oil cooler but prevents fluid flow in the opposite direction.

A converter pressure relief valve 144 is situated in passage 110 to prevent an excessive converter pressure build-up. It normally is closed by a valve spring 146, but it can be opened against the influence of spring 146 when the converter pressure exceeds a predetermined safe value, such as 70 p.s.i.

A converter drainback valve 148 communicates also with passage 110. It normally is closed by a valve spring 150. This spring will yield, however, and will allow the valve 148 to open when the pressure in passage 110 reaches a relative low value, such as 5 p.s.i. When this occurs communication is established between passage 110 and lubrication oil flow passage 152. These passages include flow restricting orifices to prevent an excessive pressure drop.

When the engine in the transmission mechanism is inoperative, the pressure in passage 110 becomes reduced. The drainback valve 148 then closes thereby preventing drainage from the torus region of the converter 18. The check valve 142 is adapted to close passage 136. Thus a so-called hydraulic lock is established for the converter 18. The converter will remain filled thereby conditioning the driveline for immediate operation upon restarting the engine.

A transmission throttle valve assembly is indicated generally by reference character 154. It includes a valve spool 156 having spaced valve lands 158 and 160. These are slidably situated within a throttle valve chamber 162. Regulated control pressure is distributed from the pump discharge passage 86 to the chamber 162 through a control pressure passage 164. The regulator valve 88 is adapted to maintain a regulated pressure in passage 86. Valve land 84 uncovers passage 134 and establishes communication between branch passage 102 and passage 134. The magnitude of the pressure maintained in passage 86 then is determined by the calibration of the springs 118 and 120.

An exhaust port 166 formed in the valve body within which the chamber 162 is formed is adapted to be closed by the valve land 160.

A throttle pressure signal passage 168 communicates with the valve chamber 162 at a location intermediate passage 164 and exhaust port 166. The pressure in it is distributed to the left hand side of land 158 through an internal passage 170 formed in valve spool 156.

A vacuum servo assembly 172, shown in FIGURE 2C, is secured to the valve body for the throttle valve assembly 154. It comprises a pair of housing parts 174 and 176, the latter being secured to a threaded adapter 178 which is received within a threaded opening at one end of the chamber 162. The margins 180 of the housing parts 174 and 176 are joined together by a crimping operation as indicated. A flexible diaphragm 182 is joined to the housing parts 174 and 176 and is secured thereto at the juncture of the peripheries thereof. The diaphragm 182 and the housing part 174 cooperate to define a pressure cavity 184 that is in communication with a hollow stem 186. This stem forms a fitting which is used to establish a connection with one end of an engine intake manifold pressure passage 188, the latter extending to the air-fuel mixture intake manifold for the engine.

A diaphragm spring 190 is situated within the housing part 174. It reacts against housing part 174 and urges the diaphragm 182 in a left hand direction, as viewed in FIGURE 2C. Secured to the central region of the diaphragm 182 is a valve operator 192. It is held fast to the diaphragm 182 by diaphragm washer situated on the other side of the diaphragm 182.

A valve operating stem 194 is engaged by the operator 192. Stem 194 is received through a central opening 196 formed in the adapter 178. The other end of stem 194 engages valve spool 156.

The valve assembly 154 acts to produce a modulated pressure signal in passage 168. The magnitude of this signal is determined by the calibration of spring 190 and by the engine intake manifold pressure in cavity 184. The cavity defined by diaphragm 182 and the housing part 176 continuously communicates with the atmosphere. The pressure made available to passage 168 therefore is related in magnitude to the engine intake manifold pressure which is an indicator of engine torque.

The vehicle operator can select any one of several drive ranges by appropriately adjusting the manual valve assembly 198 shown in FIGURE 2B. This valve assembly includes a valve element 200 which is slidably positioned within a valve chamber 202. This valve chamber is formed with internal valve lands that cooperate with a plurality of valve lands on the element 200. These are identified respectively by reference characters 204, 206, 208, 210, 212, 214, 216 and 218.

When the manual valve is positioned as shown in FIGURE 2B, the transmission mechanism assumes a neutral condition and the torque delivery paths are interrupted. Valve element 200 can be shifted, however, to any one of several operating positions which are indicated in FIGURE 2B by the reference numerals P, R, N, D2, D1 and L. These respectively identify the park position, the reverse position, neutral position, second drive range position, first drive range position and the manual low operating position. The valve chamber 202 receives control pressure from the pump 80 through branch passages 220 and 222 which communicate with control pressure passage 224. The two ends of the chamber 202 form exhaust ports. Another exhaust port is provided at 227.

Land 208 blocks branch passage 220 and land 216 blocks branch passage 222 when the valve element 200 assumes the position shown. Pressure passages 228 and 226, which communicate with the valve chamber 202, are exhausted through the right hand end of the chamber 202 and through the exhaust port 227, respectively, when the element 200 assumes the neutral position. Three other pressure passages, shown at 230, 232 and 234, are exhausted through the opening at the left hand end of the chamber 202 when the element 200 assumes the neutral position. These latter three passages communicate with the chamber 202 at a location intermediate lands 206 and 208.

Lands 212, 214, 216 and 218 are situated on one side of the element 200 and the lands 210, 208 and 206 situated on the opposite side of the element 200 are displaced 180° away from the lands 212, 214, 216 and 218. It will be apparent from FIGURES 2B and 2D that the lands are formed by means of axially extending recesses, three recesses being situated on one side of the element 200 and three other recesses being situated on the opposite side thereof. The recess that is situated between lands 206 and 208 is in fluid communication with the recess situated between lands 218 and 202.

A vehicle speed signal is obtained by means of the governor valve assembly 70, shown in FIGURE 2C, which includes a valve body 236 mounted upon a power output shaft 62. Located on one side of the axis of shaft 62 is a primary governor valve bore 238 within which is slidably received a valve spool 240. This spool includes lands 242 and 244 and it is urged radially inwardly by a valve spring 246. An exhaust port 248 is located at a radially outward region of the bore 238. Situated on the opposite side of the axis of shaft 62 is a secondary governor valve bore 250 within which is situated a secondary governor valve element 252. This valve element is urged outward radially by a valve spring 254.

Valve element 252 is formed with radially spaced valve lands of differential diameter as indicated at 256 and 258. Control pressure is distributed by means of a passage 260 to the valve bore 250 at a location intermediate the lands 256 and 258. Passage 260 receives control pressure from passage 222 when the manual valve is shifted to either the D2 position or the D1 position.

A governor pressure delivery passage 262 communicates with the valve bore 250 at a location directly adjacent valve land 256. Control pressure distributed to the differential area defined by the lands 256 and 258 passes across land 258, through radial grooves formed therein and then is distributed through a crossover passage 264 to the valve chamber 238 of the primary governor valve element. When the valve element 240 assumes the position shown, communication between passage 264 and exhaust port 248 is interrupted. This causes a pressure build-up to occur on the radially outward end of the land 258 thus urging the secondary governor valve element 252 radially inwardly against the opposing influence of spring 254. Communication between passages 260 and 262 is inhibited under these conditions. Passage 262, furthermore, is caused to communicate with an exhaust port 266 when the element 262 assumes a radially inward position.

Thus when the driven speed of the shaft 62 is less than a predetermined value, no governor pressure is made available to passage 262. After a predetermined speed is reached, however, the centrifugal force acting upon the element 240 causes this element to be urged radially outwardly against the opposing influence of spring 246. In a preferred embodiment of my invention, this occurs at a shaft speed of approximately 300 r.p.m.

At any speed greater than the predetermined speed causes element 240 to shift so that passage 264 will be in direct communication with exhaust port 248. This relieves the pressure acting upon the radially outward end of the secondary governor valve element 252. Thus the pressure in passage 260 is caused to act against the differential area of lands 258 and 256. This causes passages 260 and 262 to be brought into communication. At the same time communication between the passage 262 and exhaust port 266 is interrupted. It thus is apparent that a secondary governor valve element will modulate the pressure in passage 260. As the driven speed of the shaft 62 increases, the modulated signal pressure made available to the passage 262 is increased. This signal pressure can be used as a control variable for the transmission control system together with the torque sensitive signal made available to passage 168.

The vehicle speed signal and the torque sensitive signal are utilized by the 1–2 shift valve assembly 268 and the 2–3 shift valve assembly 270 of FIGURES 2A and 2B respectively. Valve assembly 268 includes a multiple land valve spool 272 that is slidably situated within a shift valve chamber 274. Spool 272 is formed with a plurality of valve lands 276, 278, 280, 282 and 284. It is urged in an upward direction, as viewed in FIGURE 2A, by a shift valve spring 286. Passage 226 communicates with valve chamber 274 at a location intermediate lands 278 and 280. It is provided with a flow restricting orifice 288.

A passage 290, which is in fluid communication with the apply side of the intermediate servo, communicates with a chamber 274 at a location directly adjacent land 282. An exhaust port 292 is formed in the chamber 274 at a location directly adjacent land 280.

Lands 276 and 278 are formed with a differential diameter, and modulated throttle pressure is distributed to the area defined by these differential diameters through a passage 294.

Governor pressure passage 262 communicates with the chamber 274 at the upper end of the land 276.

A passage 296, which is in fluid communication with passage 226, communicates with chamber 274 at a location directly adjacent land 278. Passage 226, as will be explained subsequently, is pressurized when the manual valve is shifted to the manual-low position.

Communication is established by the chamber 274 between passage 226 and the branch passage 298. When the valve element 272 assumes the upshift position, however, it moves downwardly, as viewed in FIGURE 2A, thereby establishing communication between branch passage 298 and exhaust port 292. Passage 298 in turn communicates with a passage 300 that extends to the pressure chamber of the reverse and low servo. The pressure in passage 300 is distributed also to the lower end of land 284 through a branch passage 302. Thus when the reverse and low servo is pressurized, the servo pressure augments the action of the spring 286 to maintain the 1–2 shift valve in the downshift position illustrated in FIGURE 2A. This inhibits an automatic upshift when the driver desires to condition the mechanism for continuous operation in the manual-low drive range.

During operation of the transmission in either the D2 drive range or the D1 drive range, passage 226 is exhausted. Thus, regardless of the position that is assumed by the valve element 272, the pressure in passage 300 remains at the atmospheric value. When the valve element 272 assumes the position shown in FIGURE 2A, passage 300 is exhausted through passage 226. When the element 272 is shifted downwardly, passage 300 is exhausted through exhaust port 292.

Whenever the element 272 assumes the position shown in FIGURE 2A, passage 290 is exhausted through port 292. This passage is in fluid communication with the apply side of the intermediate servo. When the valve element 272 is moved to the downward position, as viewed in FIGURE 2A, passage 290 is brought into fluid communication with a branch passage 304, which in turn communicates with passage 260. Passage 260 also communicates directly with the pressure chamber of the forward clutch 32. Passage 260 and the branch passage 230 receive control pressure from the manual valve whenever the manual valve element 200 is moved to the D2 position, the D1 position, or the L position. When it assumes the D2 position or the D1 position, pressurized passage 222 communicates directly with passage 230 through the manual valve chamber 202. When the manual valve element 200 assumes the L position, passage 230 is pressurized by reason of the communication that is established between branch passage 200 and branch passage 230 through the recess situated between lands 206 and 208. Branch passage 222 is blocked under these conditions by valve land 218.

When the valve element 272 assumes a downward position, pressure is distributed from passage 260 and branch passage 304 to the apply side of the intermediate servo. At that time, the pressure in passage 304 that acts upon the differential area of lands 284 and 282 is not available. Land 284 is slightly smaller in diameter than land 282. This differential area is brought into communication with passage 302 as the valve element 272 moves downwardly. Passage 302, as explained previously, is exhausted under these conditions. Thus, the movement of the valve element 272 occurs with a snap action for any given intake manifold vacuum pressure. The governor pressure that is necessary to urge the spool 272 downwardly is greater than the corresponding governor pressure that must exist before the spool 272 will be allowed to return to the position shown.

The 2-3 shift valve assembly 270 includes a valve spool 306 which has formed thereon spaced valve lands 308, 310, 312 and 314. These lands slidably cooperate with internal valve lands formed in a valve chamber 316. A throttle modulator valve, which forms a part of the 2-3 shift valve assembly is slidably situated within a lower portion of the chamber 316. It is identified by reference character 318. A shift valve spring 320 is positioned between valve 318 and the valve spool 306.

Passage 228, which is pressurized when the manual valve element 200 is shifted to the reverse position R but which is exhausted when the manual valve element 200 assumes the D2 position, the D1 position, or the L position, communicates with the valve chamber 316 at a location directly adjacent land 312. Branch passage 322 establishes fluid communication between passage 228 and the chamber 316. This chamber provides communication between passage 322 and branch passage 324 when the valve spool 306 assumes the position shown in FIGURE 2B. Passage 324, in turn, communicates with passage 326 which communicates directly with the pressure chamber for the reverse and direct clutch servo.

Passage 232, which is pressurized when the manual valve element 200 assumes the D2 position or the D1 position but which is exhausted when it assumes any other position, communicates with the chamber 316 at a location intermediate lands 310 and 312. Land 310 is formed with a diameter slightly greater than the diameter of land 312.

Thus the pressure that exists in passage 232 tends to urge the spool 306 in an upward direction, as viewed in FIGURE 2B, to supplement the action of spring 320. When the spool 306 assumes a downward position, however, passage 232 becomes blocked by land 310 and the differential area of lands 310 and 312 is exhausted through passage 322.

Passage 232, which is pressurized during operation in the D2 range or the D1 range, is in communication with the chamber 316 through another branch passage 328. This branch passage is blocked by land 314 when the spool 306 assumes the position shown. When the spool 306 assumes a downward position, however, passage 328 is brought into fluid communication with passage 324. A flow restricting orifice 330 is provided in passage 232 as indicated. Furthermore, when the spool 306 assumes a downward position, communication between passage 322 and passage 324 is interrupted.

Governor pressure passage 262 communicates also with the upper end of the chamber 316 and distributes a governor pressure signal to the other end of land 304.

The throttle pressure signal made available by the throttle valve assembly 154 is distributed to the throttle booster valve assembly 332 shown in FIGURE 2B. It comprises a double land valve spool 334 having a valve land 336 and a relatively larger diameter valve land 338. The spool 334 normally is urged in a right hand direction to the limiting position shown in FIGURE 2B by means of a valve spring 340. Valve spool 334 is slidably situated within a valve chamber 342.

Throttle pressure passage 168 communicates with chamber 342 on either side of the land 338 through branch passages 344 and 346. Control pressure from the high pressure passage 224 is distributed to the chamber 342 through a branch passage 348 which intersects the chamber 342 directly adjacent land 336. The throttle booster valve output pressure passage 350 communicates with the chamber 342 at a location intermediate the lands 336 and 338.

It is apparent from the foregoing that when the magnitude of the throttle pressure in passage 168 is less than a predetermined value, direct communication is established by the throttle booster valve chamber between passages 168 and 350. Under these conditions, the pressure in passage 350 equals the pressure in passage 168. If the pressure in passage 168 increases to a value that is sufficient to urge the spool 334 in a left hand direction, as viewed in FIGURE 2B, against the opposing influence of spring 340, land 338 tends to restrict branch passage 344 and to increase the degree of communication between control pressure passage 348 and throttle booster valve output pressure passage 350. It thus is apparent that the throttle booster valve will begin to modulate the pressure in passage 348 and to produce a resultant signal in passage 350 that is greater in magnitude than the pressure in passage 168. This signal, however, still is related proportionately to the magnitude of the pressure in the engine intake manifold system. The pressure in passage 350 is utilized by the shift valve assemblies 268 and 270 to initiate the shift points for any given value of the pressure signal in passage 350. Each point will be delayed during the acceleration period until the shift valve force exerted by the governor pressure is sufficient to overcome the influence of the signal in passage 350. Upon an increase in the magnitude of the signal in passage 350, the shift points are delayed accordingly.

In a throttle controlled internal combustion engine, the magnitude of the intake manifold pressure for any given speed increases very slightly as the engine carburetor throttle opens beyond a position corresponding to 60 percent of the wide open throttle position. In contrast, a substantial variation in manifold pressure takes place as engine carburetor throttle is increased from a closed position to the intermediate 60 percent throttle setting. Thus the throttle booster valve is calibrated so that it will begin to modulate whenever the magnitude of the throttle pressure in passage 168 approaches that value that corresponds to the 60 percent engine carburetor throttle setting. At that time, the effective pressure signal made available to the shift valves is of an amplified value. Thus a shift delay can occur regardless of whether the vehicle operator chooses to operate the engine with an advanced engine throttle setting or a reduced setting.

Control of the shift points can be established also by appropriately calibrating the throttle modulator valve. The pressure signal in passage 350 is distributed to the lower end of the valve 318. A minimum throttle upshift of the 1-2 shift valve thus may be caused to occur at some known value of governor pressure, without being influenced by throttle pressure. As soon as the pressure in passage 350 reaches some calibrated minimum value, however, spring 320 yields to establish communication between passage 350 and modulated throttle pressure passage 352. This pressure acts upon the differential area of lands 276 and 278 of the 1-2 shift valve assembly 268 thereby urging the spool 272 in an upward direction as viewed in FIGURE 2A. The modulated throttle pressure passage 352 communicates also with the shift valve chamber 316 of the 2-3 shaft valve assembly 270. Spring 320 then acts upon the lower end of valve land 314. The automatic function of the shift valve assemblies 268 and 270 can be overruled by the downshift valve assembly shown at 354. This downshift valve includes a valve spool 356 having spaced lands 358 and 360. It is urged normally in a left hand direction, as viewed in FIGURE 2B, by downshift valve spring 362. A suitable mechanical linkage mechanism that is operatively connected to the engine carburetor throttle is provided for adjusting the spool 358 in a right hand direction when the engine carburetor throttle valve is moved to its wide open position. At any engine carburetor throttle valve setting less than the wide open position, the spool 356 assumes the position shown in FIGURE 2B.

Passage 226, which is pressurized when the manual valve assumes the reverse position but which is exhausted when it assumes the D2 position or the D1 position, communicates with downshift valve chamber 364 through a branch passage 366. Spool 356 is slidably positioned within the chamber 364. When the spool 356 assumes the position shown in FIGURE 2B, direct communication is established between passage 366 and passage 368, the latter in turn communicating with the chamber 316 of the 2-3 shift valve assembly 270 and the chamber 274 of the 1-2 shift valve assembly 268. Whenever the throttle modulator valve 318 assumes a modulating position as the engine throttle is advanced beyond a minimum setting, passage 368 acts as a restricted exhaust passage.

If the operator advances the engine carburetor throttle to the wide open position, spool 356 is shifted in a right hand direction until passage 366 becomes blocked by land 358 and passage 368 is brought into fluid communication with a high pressure branch passage 370, which in turn communicates with control pressure passage 224. At this time, passage 368 becomes pressurized. If the 2-3 shift valve spool 306 at this time is in a downward position, the pressure in passage 368 causes spool 306 to assume the downshift position or the position shown in FIGURE 2B. At the same time, this pressure is made available to the differential area of the 1-2 shift valve lands 278 and 276 if the spool 272 is in the upshift position. Under these conditions, passages 294 and 296 are subjected to the same pressure. Thus the valve spool 272 is maintained in the downshift position if the governor pressure is sufficiently low.

If the governor pressure is greater than a desired value, a 1-2 downshift will not occur since the force of the pressure in passage 352 acting upon the differential area of lands 278 and 276 is not sufficient to overcome the opposing influence of the governor pressure. This is a safety feature and is desirable since it prevents a downshift to the lowest speed ratio of the transmission gearing at speeds that are greater than a safe value. The 2-3 shift valve assembly will function in the same fashion to inhibit a 3-2 downshift at any speed that is too high, but this inhibiting action occurs at a much higher speed than the corresponding inhibiting action for the 1-2 shift valve assembly.

Passage 234, when the manual valve element 200 assumes the D2 position, is brought into communication with high pressure passage 222. When the manual valve assumes any other position, however, passage 234 is exhausted through the manual valve exhaust port at the left hand end of the chamber 202. If we assume, therefore, that the manual valve assumes the D1 position, communication between passage 290 and the exhausted passage 234 is interrupted by a three-position check valve assembly, which is identified in FIGURE 2B of the drawings by reference character 372. This valve assembly includes a valve chamber 374 within which is loosely disposed a ball check valve element 376.

Upon an upshift of the 1-2 shift valve assembly, passage 304 is brought into communication with passage 290. Pressure then is distributed to a passage 378 through check valve assembly 374. Passage 378 communicates with the chamber 374 at a location adjacent the point of communication between passage 290 and chamber 374. Passage 234 also communicates with the same chamber 374. Thus the ball valve element 376 will tend to assume a position that will block the exhausted passage 234, and at the same time communication then will be established through the chamber 374 between passage 290 and passage 378.

If the manual valve element 200 is shifted to the D2 position to condition the mechanism for operation in the D2 drive range, passage 234 becomes pressurized and passage 290 continues to be exhausted through the exhaust port 292 of the 1-2 shift valve assembly. Under these conditions, the ball valve element 376 will assume the position shown in the drawings by blocking the exhaust flow path. At the same time, communication is established between passage 234 and passage 378.

Passage 380, which extends to the apply side of the intermediate servo, is in fluid communication with passage 378 through the 2-3 backout valve assembly 382. This assembly includes a valve element 384 having spaced valve lands 386 and 388. Spool 384 is urged in an upward direction, as viewed in FIGURE 2B, by valve spring 390. Both passages 380 and 378 communicate with the valve chamber 392 for the valve element 384 at a location intermediate the lands 386 and 388. Passage 326, on the other hand, communicates with the 2-3 backout valve chamber 392 at a location on the upper side of the land 386.

Throttle pressure from throttle pressure passage 168 is distributed directly to the lower region of valve chamber 392 to assist the force of spring 390. During normal operation of the transmission mechanism under torque, the primary throttle pressure in passage 168 and the spring force of spring 390 are sufficient to maintain the spool 384 in the position shown in FIGURE 2B during a 2-3 upshift. During such an upshift, the 2-3 shift valve spool 306 will move from the position shown in FIGURE 2B to a downward position thereby establishing communication between high pressure passage 232 and passage 324. This pressure is distributed through passage 326 to the direct drive clutch 36. It is distributed also to passage 394 through the 3-2 coasting control valve assembly, which will be described subsequently. The pressure thus distributed to passage 394 is distributed to the release side of the intermediate brake servo to release band 38 in timed relationship with the application of the direct drive clutch 36. As soon as the accumulation of the intermediate servo is completed and the pressure builds up in the direct drive clutch, the pressure in passage 326 is sufficient to urge the valve spool 384 in a downward direction thereby interrupting communication between passages 378 and 380 and establishing direct communication between passage 326 and passage 380. The passage 380 thus is pressurized continuously, and the servo is controlled by controlling distribution of pressure to the release side of the servo. This is accomplished as we have seen by the 2-3 shift valve assembly after the 1-2 shift valve assembly has assumed its upshift position.

Passage 380 is not pressurized when the mechanism is operating in its lowest speed ratio, but it becomes pressurized during acceleration upon a 1-2 upshift by reason of the action of the 1-2 shift valve assembly as we have seen previously. Under these conditions, of course, the release side in the intermediate servo is exhausted through the 2-3 shift valve assembly and passage 322 which, of course, communicates with the exhaust opening in the manual valve assembly through the passage 228.

If the vehicle operator should relax the engine throttle during the acceleration period but prior to the time that a normal 2-3 upshift occurs, the direct drive clutch normally would tend to lock up or freeze before the intermediate servo is fully disengaged. This is due to the fact that the transmission is not delivering torque under such relaxed throttle driving conditions. The 2-3 backout valve, however, tends to avoid any undesirable harshness in such a shift that might be due to a simultaneous engagement of the direct drive clutch and the intermediate servo. This is accomplished in the following fashion.

If we assume that the operator relaxes the throttle while the vehicle is accelerating in the intermediate speed ratio, the force due to the throttle pressure in passage 168 acting upon the valve spool 384 becomes reduced. Thus as the 2-3 shift valve is caused to move to the upshift position and as passage 328 is brought into communication with passage 324, a pressure build-up tends to occur in passage 326. This pressure build-up is sensed by the 2-3 backout valve assembly as the pressure on the upper end of the land 386 begins to develop. Since the throttle pressure force at this time is absent or is at a minimum value, passage 326 is brought into communication with passage 380 as the valve spool 384 is shifted in a downward direction as viewed in FIGURE 2B. The 2-3 backout valve may be calibrated so that the so-called end point at which the direct drive clutch becomes engaged is coincident with the release of the intermediate servo. After the shift is accomplished, the transmission is conditioned for direct drive operation with clutch 36 fully engaged and with the intermediate servo fully released. The spool 384 then assumes a downward position in the usual fashion.

The timing between the release of the intermediate servo and the application of the brake 36 under minimum throttle conditions in which the throttle pressure is of a low value but of a value greater than zero, the shifting of the spool 384 will be delayed. Thus accumulation of the intermediate servo is delayed to correspond to the later end point of the clutch 36. When shifts are made at a still greater throttle pressure, the effect of the 2-3 backout valve assembly is washed out and the assembly has no influence on the shift timing. It is functional only during 2-3 shifts under minimum throttle conditions or under very reduced throttle conditions.

In order to make certain that the spool 384 will be shifted to the position shown in FIGURE 2B, when the driver shifts the manual valve to the L position, a manual low valve 396 is provided. This valve is situated at the lower end of the chamber 392. The spring 390 is disposed between valve 396 and the lower end of the land 388. Passage 226, which is pressurized when the operator shifts the manual valve element 200 to the L position, passes directly through the downshift valve chamber 364 to the passage 368. This passage in turn communicates with the lower end of the manual valve 396 through a passage 398. This overrules the influence of any of the other pressures acting upon the spool 384 and assures that the passage 380 will always be in communication with passage 378 rather than with passage 326, which is exhausted under these conditions. When the valve element 200 of the manual valve assembly is moved to the L position, the pressure which is made available to passage 368 is distributed also to the lower end of the 2-3 shift valve spool 305 and to the 1-2 shift valve chamber 274 thereby tending to urge each of the shift valve assemblies to their downshift positions in the manner described previously.

When the manual valve spool 200 is shifted to the reverse drive position, passage 228 is brought into communication with passage 226 and with branch passage 220. It therefore is pressurized with the regulated control pressure made available to passages 86 and 224. This pressure is distributed through the 2-3 shift valve chamber 316, through passage 324 and hence to passage 326. This causes the reverse and direct clutch 36 to become applied as passage 394 becomes pressurized. This, of course, pressurizes the release side of the intermediate servo. Passage 300 also becomes pressurized since it communicates directly with the pressurized passage 226 through the 1-2 shift valve chamber 274. This causes the reverse and low servo to become energized. Thus the transmission is conditioned for reverse drive operation.

When the manual valve element 200 assumes a reverse drive position, passage 228, which is pressurized as described previously, communicates directly with the differential area defined by the valve lands 126 and 116 of the pressure booster valve associated with the main regulator valve. This tends to increase the net force acting in an upward direction, as viewed in FIGURE 2A, upon the spool 92. This results in an increased regulated control pressure in passage 86 and the communicating control pressure passages. The transmission servos thus are conditioned for accommodating the increased reaction torque that is experienced during reverse drive operation.

Throttle pressure passage 168 communicates with passage 400, which extends to the coasting boost valve assembly of FIGURE 2A. This valve assembly includes a valve spool 402 which is slidably situated within a valve chamber 404. Spool 402 is formed with spaced valve lands 406 and 408, which cooperate with internal valve lands formed in the valve chamber 404. Spool 402 is biased in an upward direction by a valve spring 410. Passage 400 communicates with a passage 412 through the valve chamber 404 when the spool 402 assumes the position shown in FIGURE 2A. Passage 412 in turn extends to the pressure booster valve associated with the main regulator valve and distributes throttle pressure to the lower end of land 122 thus supplementing the action of the regulator valve spring 118.

Communicating with the valve chamber 404 at a location adjacent land 408 is a branch passage 414 which communicates in turn with the control pressure passage 224. Governor pressure passage 262 communicates with the upper end of the valve chamber 404 and distributes governor pressure to the upper surface of land 406. The force produced by this governor pressure opposes the force of spring 410 and the pressure force due to the throttle pressure acting upon land 408. The magnitude of the operating pressure level maintained by the regulator valve thus depends upon the magnitude of the intake manifold pressure. An increase in the manifold pressure will result in an increase in the operating pressure level maintained by regulator valve.

The optimum value for the throttle pressure in passage 168 for any given manifold pressure is determined by the requirements of the shift valve system including the 2-3 backout valve. The calibration of the primary throttle valve is tailored to satisfy the requirements of the shift valve system and to produce the desired shift points. This calibration is not necessarily consistent with the calibration of the main regulator valve. For example, it has been found to be desirable to calibrate the regulator valve so that the minimum control pressure that is maintained will not fall below the calibrated minimum value regardless of the magnitude of the engine intake manifold pressure. In one operating embodiment, the minimum regulated control pressure that the regulator valve is caused to maintain is equivalent to that which is required to maintain torque capacity with an engine intake manifold pressure of fifteen inches of mercury. Upon an increase in the magnitude of the engine intake manifold pressure beyond the calibrated minimum value, it is desirable to allow the throttle pressure to increase the regulated pressure level maintained by the regulator valve so that the control pressure level in the circuit is consistent with the torque transmitting requirements that exist during such high torque operation. The operating pressure level that is maintained by the regulator valve during operation of the engine with manifold pressures between zero and fifteen inches of mercury therefore is determined by the calibration of both of the springs 118 and 120. When a throttle pressure that is equivalent to fifteen inches of mercury in the engine intake manifold system is reached, the characteristics of spring 120 fade out and the pressure differential that is due to subsequent increases in the magnitude of the throttle pressure then are transferred directly to the regulator valve spool 92. The operating pressure level then is determined by the calibration of only the one spring 118 and the magnitude of the throttle pressure force acting upon land 122.

Upon an increase in the vehicle speed during the acceleration period, it is desirable to cut-back the pressure maintained in the control circuit at a time prior to the initiation of the speed ratio shifts by the fluid pressure operated servos. Under normal conditions, this coincides with a reduced hydrokinetic torque ratio in the torque converter. The torque transmitting requirements of the servos and the friction elements thus are reduced accordingly. I therefore have provided a cutback valve assembly as shown in FIGURE 2C at 416. It includes a cutback valve spool 418 which has formed thereon three spaced valve lands 420, 422 and 424. Spool 418 is slidably disposed within a valve chamber 426, which has formed thereon internal valve lands that cooperate with the external valve lands 420, 422 and 424. Governor pressure passage 262 communicates with the lower region of the chamber 426 and distributes governor pressure to the lower end of land 424 through a branch passage 428. An exhaust port 430 communicates with the chamber 426 at a location directly adjacent land 420.

Lands 420 and 424 are formed with a differential diameter to define an area that is in fluid communication with throttle pressure passage 168 through passage 432. Throttle pressure tends to maintain the valve spool 418 in the position shown when the governor pressure is of a reduced value. Under these conditions, valve chamber 426 establishes communication between passage 432 and a cutback pressure passage 434 which extends directly to the pressure booster valve of the main regulator valve assembly. The pressure in passage 434 acts upon the differential area defined by lands 122 and 124 thereby assisting the pressure force exerted upon the lower end of land 122 by throttle pressure in passage 128.

If the magnitude of the governor pressure in passage 428 increases to a value that is sufficient to urge spool 418 upwardly, as viewed in FIGURE 2C, against the opposing influence of the throttle pressure of any given magnitude in passage 432, communication between passages 432 and 434 is interrupted by land 422. Communication is established simultaneously between passage 434 and exhaust port 430. There then is an immediate change in the magnitude of the effective pressure forces acting upon the main regulator valve assembly so that a lower effective control pressure is maintained.

The cutback valve assembly can be calibrated so that it will be shifted to the control pressure cutback position only after the torque converter assumes a relatively high speed ratio condition. It is contemplated that the automatic speed ratio shifts will occur after the cutback valve assembly has assumed its cutback position. The governor pressure at which a cutback will occur increases as the magnitude of the engine intake manifold increases. This delay is desirable since the converter will maintain a hydrokinetic torque multiplication ratio throughout a longer time interval of the acceleration period when the manifold pressure is higher than it would be for a corresponding period of acceleration with a reduced engine manifold pressure. The line pressure cutback thus is delayed by throttle pressure in a manner as illustrated in FIGURE 3. Maximum delay occurs, of course, during wide open throttle operation.

It is desirable to maintain a high torque transmitting capacity in the friction members and the fluid pressure operated servos during engine braking when the vehicle traction wheels act as a driving means and the vehicle engine functions to absorb power. This is especially significant when engine braking occurs at high vehicle speeds. Since the vehicle engine carburetor throttle is closed under such conditions, the manifold pressure, and hence the throttle pressure, is at a minimum value. Thus the regulator valve assembly normally would tend to maintain a minimum control pressure level in the system. In order to overcome this tendency and to allow the friction members to maintain adequate torque transmitting capacity when coasting at high speeds, I have provided the coasting boost valve assembly shown in FIGURE 2A. During normal operation under torque, throttle pressure exists in passage 400 and the associated pressure force acting upon the spool 402, as well as the force of spring 410, maintains spool 402 in an upward position thereby maintaining continuous communication between passages 400 and 412. If the vehicle is operating at high speeds and the vehicle engine carburetor throttle is relaxed, the governor pressure that acts upon the upper end of land 406 is sufficient to shift the spool 402 downwardly against the opposing influence of spring 410 thereby establishing communication between passage 412 and control pressure passage 414. Control pressure then is substituted for throttle pressure at the lower end of the land 122 of the pressure booster valve for the main regulator valve assembly. A higher operating pressure is maintained in the system, therefore, as long as the governor pressure is sufficient to overcome the influence of spring 410.

When vehicle speed is reduced to a value below a predetermined safe value, the spool 402 is allowed to assume its normal position, as illustrated in FIGURE 2A. The reduced pressure then made available to the system is sufficient under these conditions to maintain adequate torque capacity for the friction members.

Figure 4:
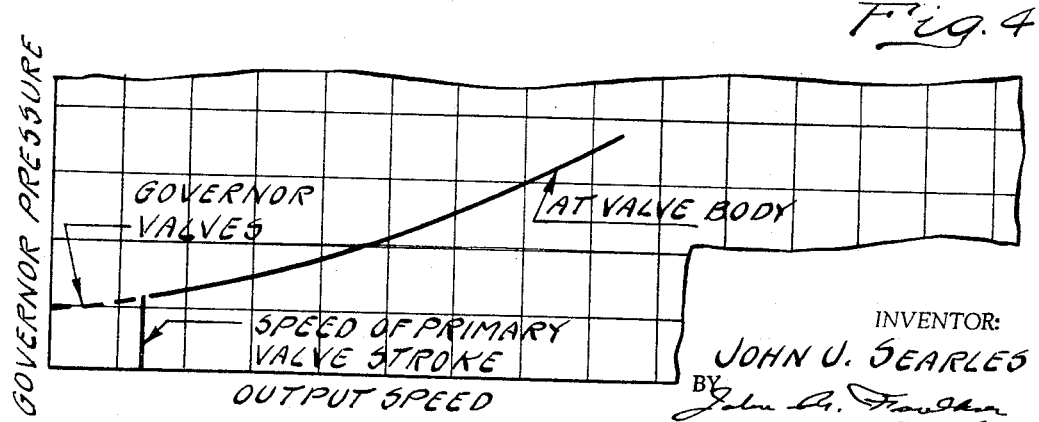
FIGURE 4 shows the governor valve operating characteristics.

In FIGURE 4, I have illustrated the characteristics of the governor valve assembly 70. At any speed less than the speed at which the primary valve shifts, which may be 390 r.p.m., the governor pressure signal is of zero magnitude. Thus the minimum speed at which the line pressure cutback can occur, as illustrated in FIGURE 3, is that speed that corresponds to a tailshaft speed of about 390 r.p.m.

A control pressure relief valve 434 is in fluid communication with passage 86. It functions to limit the maximum pressure that the pump 80 can deliver. At pressures less than a maximum value of approximately 275 p.s.i., the relief valve 434 is closed and performs no function.

Having thus described a preferred form of my invention, what I claim and desire to secure by U.S. Letters Patent is:

1. In a control system for a hydrokinetic torque transmission mechanism for use in a driveline having an engine, a driven member, a fluid pressure source, fluid pressure operated servos, conduit structure interconnecting said source and said servos including fluid pressure distributor valve means for distributing selectively pressure from said source to said servos, a source of a first pressure signal that is sensitive to engine torque, a source of a second pressure signal that is sensitive to the driven speed of said driven member, said distributor valve means being subjected to said signals and actuated thereby, a pressure regulator valve means including a regulating valve element disposed in said conduit structure for maintaining a regulated pressure level in said system, a pressure booster valve means forming a part of said regulator valve means and including a movable valve element, a spring disposed between said regulator valve element and said booster valve element for applying a calibrated force on said regulator valve element, a mechanical stop adapted to be engaged by said booster valve element under the force of said spring, means for distributing said first pressure signal to said booster valve means to effect an increase in the regulated pressure level in said system when engine torque increases, the force of said spring overruling the influence of said first pressure signal on said booster valve means when the engine torque is less than a predetermined value whereby the pressure level in said system is not allowed to be reduced to a value less than a predetermined minimum.

2. In a control system for a hydrokinetic power transmission mechanism in an automotive vehicle driveline having an internal combustion engine with a carburetor throttle controlled air intake manifold, a driven member, a fluid pressure source drivably connected to said engine, gearing having gear elements that define plural torque delivery paths between said engine and said driven member, fluid pressure operated servos for controlling the relative motion of the elements of said gearing to establish speed ratio changes, conduit structure interconnecting said servos and said pressure source including fluid pressure distributor valve means for distributing selectively pressure from said source to said servos, a source of a throttle pressure signal that is proportional in magnitude to the pressure in said engine intake manifold, a source of a speed pressure signal that is proportional in magnitude to the driven speed of said driven member, said distributor valve means being subjected to said signals and actuated thereby, a pressure regulator valve means including a regulator valve element disposed in said conduit structure for maintaining a regulated pressure level in said system, a pressure booster valve means forming a part of said regulator valve means and including a movable valve element, a spring disposed between said regulator valve element and said booster valve element for applying a calibrated force on said regulator valve element, a mechanical stop adapted to be engaged by said booster valve element under the force of said spring, first passage means for distributing said throttle pressure signal to said booster valve means to effect an increase in the regulated pressure level in said system when the manifold pressure increases, second passage means for distributing said throttle pressure signal to said regulator valve means to supplement the effect of the throttle pressure signal in said first passage means, the force of said spring overruling the influence of the throttle pressure in said first passage means on said booster valve means when the engine torque is less than a predetermined value whereby the pressure level in said system is not allowed to be reduced to a value less than a predetermined minimum, and cutback valve means in communication with said speed pressure signal source for interrupting distribution of throttle pressure signal through said second passage means upon an increase in the driven speed of said driven member to a value greater than a predetermined value thereby effecting a reduction in the operating pressure level maintained in the system for any given engine torque when said driven member is operated at high speeds.

3. In a control system for a hydrokinetic power transmission mechanism in an automotive vehicle driveline having an internal combustion engine with a carburetor throttle controlled air intake manifold, a driven member, a fluid pressure source drivably connected to said engine, gearing having gear elements that define plural torque delivery paths between said engine and said driven member, fluid pressure operated servos for controlling the relative motion of the elements of said gearing to establish speed ratio changes, conduit structure interconnecting said servos and said pressure source including fluid pressure distributor valve means for distributing selectively pressure from said source to said servos, a source of a throttle pressure signal that is proportional in magnitude to the pressure in said engine intake manifold, a source of a speed pressure signal that is proportional in magnitude to the driven speed of said driven member, said distributor valve means being subjected to said signals and actuated thereby, a pressure regulator valve means including a regulator valve element disposed in said conduit structure for maintaining a regulated pressure level in said system, a pressure booster valve means forming a part of said regulator valve means and including a movable valve element, a spring disposed between said regulator valve element and said booster valve element for applying a calibrated force on said regulator valve element, a mechanical stop adapted to be engaged by said booster valve element under the force of said spring, first passage means for distributing said throttle pressure signal to said booster valve means to effect an increase in the regulated pressure level in said system when the manifold pressure increases, second passage means for distributing said throttle pressure signal to said regulator valve means to supplement the effect of the throttle pressure signal in said first passage means, the force of said spring overruling the influence of the throttle pressure in said first passage means on said booster valve means when the engine torque is less than a predetermined value whereby the pressure level in said system is not allowed to be reduced to a value less than a predetermined minimum, and cutback valve means in communication with said speed pressure signal source for interrupting distribution of throttle pressure signal through said second passage means upon an increase in the driven speed of said driven member to a value greater than a predetermined value thereby effecting a reduction in the operating pressure level maintained in the system for any given engine torque when said driven member is operated at high speeds, said cutback valve means being in fluid communication with said throttle pressure signal source, the throttle pressure signal acting upon said cutback valve means to oppose the influence of said speed signal thereon thereby causing an increase in the speed at which the operating pressure level maintained by said regulator valve means is reduced during a period of acceleration of said driven member, the magnitude of said increase in speed being proportional to engine manifold pressure.

4. In a control system for a hydrokinetic torque transmission mechanism for use in a driveline having an engine, a driven member, a fluid pressure source, fluid pressure operated servos, conduit structure interconnecting said source and said servos including fluid pressure distributor valve means for distributing selectively pressure from said source to said servos, a source of a first pressure signal that is sensitive to engine torque, a source of a second pressure signal that is sensitive to the driven speed of said driven member, said distributor valve means being subjected to said signals and actuated thereby, a pressure regulator valve means including a regulator valve element disposed in said conduit structure for maintaining a regulated pressure level in said system, a pressure booster valve means forming a part of said regulator valve means and including a movable valve element, a spring disposed between said regulator valve element and said booster valve element for applying a calibrated force on said regulator valve element, a mechanical stop adapted to be engaged by said booster valve element under the force of said spring, means for distributing said first pressure signal to said booster valve means to effect an increase in the regulated pressure level in said system when engine torque increases, the force of said spring overruling the influence of said first pressure signal on said booster valve means when the engine torque is less than a predetermined value whereby the pressure level in said system is not allowed to be reduced to a value less than a predetermined minimum, said first pressure signal distributing means including a passage connecting said first pressure signal source and said regulator valve means, and cutback valve means disposed in and partly defining said connecting passage, said cutback valve means being in fluid communication with said second pressure signal source and being actuated upon an increase in the magnitude of said second pressure signal to block said connecting passage.

5. In a control system for a hydrokinetic torque transmission mechanism for use in a driveline having an engine, a driven member, a fluid pressure source, fluid pressure operated servos, conduit structure interconnecting said source and said servos including fluid pressure distributor valve means for distributing selectively pressure from said source to said servos, a source of a first pressure signal that is sensitive to engine torque, a source of a second pressure signal that is sensitive to the driven speed of said driven member, said distributor valve means being subjected to said signals and actuated thereby, a pressure regulator valve means including a regulator valve element disposed in said conduit structure for maintaining a regulated pressure level in said system, a pressure booster valve means forming a part of said regulator valve means and including a movable valve element, a spring disposed between said regulator valve element and said booster valve element for applying a calibrated force on said regulator valve element, a mechanical stop adapted to be engaged by said booster valve element under the force of said spring, means for distributing said first pressure signal to said booster valve means to effect an increase in the regulated pressure level in said system when engine torque increases, the force of said spring overruling the influence of said first pressure signal on said booster valve means when the engine torque is less than a predetermined value whereby the pressure level in said system is not allowed to be reduced to a value that is less than a predetermined minimum, and cutback valve means in fluid communication with said regulator valve means for changing the regulating characteristics of the latter, said cutback valve means including a movable valve element having opposed fluid pressure areas, one of said areas being subjected to said second pressure signal and the other area being subjected to said first pressure signal whereby increases in the magnitude of said first pressure signal delay the change in the operating pressure level maintained by said regulator valve means during a period of acceleration of said driven member, the magnitude of said delay being proportional to engine torque.

6. In a control system for a hydrokinetic torque transmission mechanism for use in a driveline having an engine, a driven member, a fluid pressure source, fluid pressure operated servos, conduit structure interconnecting said source and said servos including fluid pressure distributor valve means for distributing selectively pressure from said source to said servos, a source of a first pressure signal that is sensitive to engine torque, a source of a second pressure signal that is sensitive to the driven speed of said driven member, said distributor valve means being subjected to said signals and actuated thereby, a pressure regulator valve means including a regulator valve element disposed in said conduit structure for maintaining a regulated pressure level in said system, a pressure booster valve means forming a part of said regulator valve means and including a movable valve element, a spring disposed between said regulator valve element and said booster valve element for applying a calibrated force on said regulator valve element, a mechanical stop adapted to be engaged by said booster valve element under the force of said spring, means for distributing said first pressure signal to said booster valve means to effect an increase in the regulated pressure level in said system when engine torque increases, the force of said spring overruling the influence of said first pressure signal on said booster valve means when the engine torque is less than a predetermined value whereby the pressure level in said system is not allowed to be reduced to a value less than a predetermined minimum, coasting boost valve means situated in and partly defining said first signal distributing means for augmenting said regulated pressure level during operation at high speeds and reduced torque, said coasting boost valve means being subjected to said second pressure signal, the pressure force established by said second pressure signal on said coasting boost valve means opposing the pressure force established thereon by said first pressure signal, said coasting boost valve means being in fluid communication with a high pressure portion of said system and adapted to establish communication between said regulator valve means and said high pressure portion when the magnitude of said first pressure signal is reduced and the magnitude of said second pressure signal is greater than a predetermined value.

7. In a control system for a hydrokinetic power transmission mechanism in an automotive vehicle driveline having an internal combustion engine with a carburetor throttle controlled air intake manifold, a driven member, a fluid pressure source drivably connected to said engine, gearing having gear elements that define plural torque delivery paths between said engine and said driven member, fluid pressure operated servos for controlling the relative motion of the elements of said gearing to establish speed ratio changes, conduit structure interconnecting said servos and said pressure source including fluid pressure distributor valve means for distributing selectively pressure from said source to said servos, a source of a throttle pressure signal that is proportional in magnitude to the pressure in said engine intake manifold, a source of a speed pressure signal that is proportional in magnitude to the driven speed of said driven member, said distributor valve means being subjected to said signals and actuated thereby, a pressure regulator valve means including a regulator valve element disposed in said conduit structure for maintaining a regulated pressure level in said system, a pressure booster valve means forming a part of said regulator valve means and including a movable valve element, a spring disposed between said regulator valve element and said booster valve element for applying a calibrated force on said regulator valve element, a mechanical stop adapted to be engaged by said booster valve element under the force of said spring, first passage means for distributing said throttle pressure signal to said booster valve means to effect an increase in the regulated pressure level in said system when the manifold pressure increases, second passage means for distributing said throttle pressure signal to said regulator valve means to supplement the effect of the throttle pressure signal in said first passage means, the force of said spring overruling the influence of the throttle pressure in said first passage means on said booster valve means when the engine torque is less than a predetermined value whereby the pressure level in said system is not allowed to be reduced to a value less than a predetermined minimum, and cutback valve means in communication with said speed pressure signal source for interrupting distribution of throttle pressure signal through said second passage means upon an increase in the driven speed of said driven member to a value greater than a predetermined value thereby effecting a reduction in the operating pressure level maintained in the system for any given engine torque when said driven member is operated at high speeds, coasting boost valve means situated in and partly defining a hydraulic connection between said first pressure signal source and said regulator valve means, said coasting boost valve means being subjected to said speed pressure signal, the pressure force established by said speed pressure signal opposing the pressure force established by said throttle pressure signal, said coasting boost valve means being in fluid communication with a high pressure portion of said system and adapted to establish communication between said regulator valve means and said high pressure portion when the magnitude of said throttle pressure signal is reduced and the magnitude of said speed pressure signal is greater than a predetermined value.

8. In a control system for a hydrokinetic power transmission mechanism in an automotive vehicle driveline having an internal combustion engine with a carburetor throttle controlled air intake manifold, a driven member, a fluid pressure source drivably connected to said engine, gearing having gear elements that define plural torque delivery paths between said engine and said driven member, fluid pressure operated servos for controlling the relative motion of the elements of said gearing to establish speed ratio changes, conduit structure interconnecting said servos and said pressure source including fluid pressure distributor valve means for distributing selectively pressure from said source to said servos, a source of a throttle pressure signal that is proportional in magnitude to the pressure in said engine intake manifold, a source of a speed pressure signal that is proportional in magnitude to the driven speed of said driven member, said distributor valve means being subjected to said signals and actuated thereby, a pressure regulator valve means including a regulator valve element disposed in said conduit structure for maintaining a regulated pressure level in said system, a pressure booster valve means forming a part of said regulator valve means and including a movable valve element, a spring disposed between said regulator valve element and said booster valve element for applying a calibrated force on said regulator valve element, a mechanical stop adapted to be engaged by said booster valve element under the force of said spring, first passage means for distributing said throttle pressure signal to said booster valve means to effect an increase in the regulated pressure level in said system when the manifold pressure increases, second passage means for distributing said throttle pressure signal to said regulator valve means to supplement the effect of the throttle pressure signal in said first passage means, the force of said spring overruling the influence of the throttle pressure in said first passage means on said booster valve means when the engine torque is less than a predetermined value whereby the pressure level in said system is not allowed to be reduced to a value less than a predetermined minimum, and cutback valve means in communication with said speed pressure signal source for interrupting distribution of throttle pressure signal through said second passage means upon increase in the driven speed of said driven member to a value greater than a predetermined value thereby effecting a reduction in the operating pressure level maintained in the system for any given engine torque when said driven member is operated at high speeds, said cutback valve means being in fluid communication with said throttle pressure signal source, the throttle pressure signal acting upon said cutback valve means to oppose the influence of said speed signal thereon thereby causing an increase in the speed at which the operating pressure level maintained by said regulator valve means is reduced during a period of acceleration of said driven member, the magnitude of the delay being proportional to engine manifold pressure, coasting boost valve means situated in and partly defining a hydraulic connection between said first pressure signal source and said regulator valve means, said coasting boost valve means being subjected to said speed pressure signal, the pressure force established by said speed pressure signal opposing the pressure force established by said throttle pressure signal, said coasting boost valve means being in fluid communication with a high pressure portion of said system and adapted to establish communication between said regulator valve means and said high pressure portion when the engine torque is reduced and the driven speed is high.

9. In a control system for a hydrokinetic torque transmission mechanism for use in a driveline having an engine, a driven member, a fluid pressure source, fluid pressure operated servos, conduit structure interconnecting said source and said servos including fluid pressure distributor valve means for distributing selectively pressure from said source to said servos, a source of a first pressure signal that is sensitive to engine torque, a source of a second pressure signal that is sensitive to the driven speed of said driven member, said distributor valve means being subjected to said signals and actuated thereby, a pressure regulator valve means including a regulator valve element disposed in said conduit structure for maintaining a regulated pressure level in said system, a pressure booster valve means forming a part of said regulator valve means and including a movable valve element, a spring disposed between said regulator valve element and said booster valve element for applying a calibrated force on said regulator valve element, a mechanical stop adapted to be engaged by said booster valve element under the force of said spring, means for distributing said first pressure signal to said booster valve means to effect an increase in the regulated pressure level in said system when engine torque increases, the force of said spring overruling the influence of said first pressure signal on said booster valve means when the engine torque is less than a predetermined value whereby the pressure level in said system is not allowed to be reduced to a value less than a predetermined minimum, said first pressure signal distributing means including a passage connecting said first pressure signal source and said regulator valve means, cutback valve means disposed in and partly defining said connecting passage, said cutback valve means being in fluid communication with said second pressure signal source and being actuated upon an increase in the magnitude of said second pressure signal to interrupt the connection through said connecting passage, coasting boost valve means situated in and partly defining a hydraulic connection between said first pressure signal source and said regulator valve means, said coasting boost valve means being subjected to said second pressure signal, the pressure force established on said coasting boost valve means by said second pressure signal opposing the pressure force established thereon by said first pressure signal, said coasting boost valve means being in fluid communication with a high pressure portion of said system and adapted to establish communication between said regulator valve means and said high pressure portion when the torque is reduced and the speed is high.

10. In a control system for a hydrokinetic torque transmission mechanism for use in a driveline having an engine, a driven member, a fluid pressure source, fluid pressure operated servos, conduit structure interconnecting said source and said servos including fluid pressure distributor valve means for distributing selectively pressure from said source to said servos, a source of a first pressure signal that is sensitive to engine torque, a source of a second pressure signal that is sensitive to the driven speed of said driven member, said distributor valve means being subjected to said signals and actuated thereby, a pressure regulator valve means including a regulator valve element disposed in said conduit structure for maintaining a regulated pressure level in said system, a pressure booster valve means forming a part of said regulator valve means and including a movable valve element, a spring disposed between said regulator valve element, and said booster valve element for applying a calibrated force on said regulator valve element, a mechanical stop adapted to be engaged by said booster valve element under the force of said spring, means for distributing said first pressure signal to said booster valve means to effect an increase in the regulated pressure level in said system when engine torque increases, the force of said spring for overruling the influence of said first pressure signal on said booster valve means when the engine torque is less than a predetermined value whereby the pressure level in said system is not allowed to be reduced to a value that is less than a predetermined minimum, and cutback valve means in fluid communication with said regulator valve means for changing the regulating characteristics of the latter, said cutback valve means including a movable valve element having opposed fluid pressure areas, one of said areas being subjected to said second pressure signal and the other area being subjected to said first pressure signal whereby increases in the magnitude of said first pressure signal delay the change in the operating pressure level maintained by said regulator valve means during a period of acceleration of said driven member, the magnitude of said delay being proportional to engine torque, coasting boost valve means situated in and partly defining a hydraulic connection between said first pressure signal source and said regulator valve means, said coasting boost valve means being subjected to said second pressure signal, the pressure force established on said coasting boost valve means by said second pressure signal opposing the pressure force established thereon by said first pressure signal, said coasting boost valve means being in fluid communication with a high pressure portion of said system and adapted to establish communication between said regulator valve means and said high pressure portion when the engine torque is low and the driven speed is high.

11. In a control system for a hydrokinetic torque transmission mechanism for use in a driveline having an engine, a driven member, a fluid pressure source, fluid pressure operated servos, conduit structure interconnecting said source and said servos including fluid pressure distributor valve means for distributing selectively pressure from said source to said servos, a source of a first pressure signal that is sensitive to engine torque, a source of a second pressure signal that is sensitive to the driven speed of said driven member, said distributor valve means being subjected to said signals and actuated thereby, a pressure regulator valve means disposed in said conduit structure for maintaining a regulated pressure level in said system, means for distributing said first pressure signal to said regulator valve means to effect an increase in the regulated pressure level in said system when engine torque increases, said regulator valve means comprising a main regulator valve spool and a pressure booster valve situated in a common valve cavity in coaxial relationship, spring means situated between said booster valve and said main valve spool, and a fluid pressure area formed in said valve spool in fluid communication with a high pressure region of said system thereby establishing a hydraulic force that opposes the force of said spring means, said booster valve having formed thereon a fluid pressure area that is in fluid communication with said first pressure signal source, the latter creating a pressure force on said booster valve that is opposed by said spring means whereby the pressure level in said system is not allowed to be reduced to a value less than a predetermined minimum when engine torque is less than a predetermined value.

12. In a control system for a hydrokinetic power transmission mechanism in an automotive vehicle driveline having an internal combustion engine with a carburetor throttle controlled air intake manifold, a driven member, a fluid pressure source drivably connected to said engine, gearing having gear elements that define plural torque delivery paths between said engine and said driven member, fluid pressure operated servos for controlling the relative motion of the elements of said gearing to establish speed ratio changes, conduit structure interconnecting said servos and said pressure source including fluid pressure distributor valve means for distributing selectively pressure from said source to said servos, a source of a throttle pressure signal that is proportional in magnitude to the pressure in said engine intake manifold, a source of a speed pressure signal that is proportional in magnitude to the driven speed of said driven member, said distributor valve means being subjected to said signals and actuated thereby, a pressure regulator valve means disposed in said conduit structure for maintaining a regulated pressure level in said system, first passage means for distributing said throttle pressure signal to said regulator valve means to effect an increase in the regulated pressure level in said system when the manifold pressure increases, second passage means for distributing said throttle pressure signal to said regulator valve means to supplement the effect of the throttle pressure signal in said first passage means, cutback valve means in communication with said speed pressure signal source for interrupting distribution of throttle pressure signal through said second passage means upon an increase in the driven speed of said driven member to a value greater than a predetermined value thereby effecting a reduction in the operating pressure level maintained in the system for any given engine torque when said driven member is operated at high speeds, said regulator valve means comprising a main regulator valve spool and a pressure booster valve situated in a common valve cavity in coaxial relationship, spring means situated between said booster valve and said main valve spool, and a fluid pressure area formed in said valve spool in fluid communication with a high pressure region of said system thereby establishing a hydraulic force that opposes the force of said spring means, said booster valve having formed thereon a fluid pressure area that is in fluid communication with said first pressure signal source, the latter creating a pressure force on said booster valve that is opposed by said spring means whereby the pressure level in said system is not allowed to be reduced to a value less than a predetermined minimum when engine torque is less than a predetermined value.

13. In a control system for a hydrokinetic power transmission mechanism in an automotive vehicle driveline having an internal combustion engine with a carburetor throttle controlled air intake manifold, a driven member, a fluid pressure source drivably connected to said engine, gearing having gear elements that define plural torque delivery paths between said engine and said driven member, fluid pressure operated servos for controlling the relative motion of the elements of said gearing to establish speed ratio changes, conduit structure interconnecting said servos and said pressure source including fluid pressure distributor valve means for distributing selectively pressure from said source to said servos, a source of a throttle pressure signal that is proportional in magnitude to the pressure in said engine intake manifold, a source of a speed pressure signal that is proportional in magnitude to the driven speed of said driven member, said distributor valve means being subjected to said signals and actuated thereby, a pressure regulator valve means disposed in said conduit structure for maintaining a regulated pressure level in said system, first passage means for distributing said throttle pressure signal to said regulator valve means to effect an increase in the regulated pressure level in said system when the manifold pressure increases, second passage means for distributing said throttle pressure signal to said regulator valve means to supplement the effect of the throttle pressure signal in said first passage means, and cutback valve means in communication with said speed pressure signal source for interrupting distribution of throttle pressure signal through said second passage means upon an increase in the driven speed of said driven member to a value greater than a predetermined value thereby effecting a reduction in the operating pressure level maintained in the system for any given engine torque when said driven member is operated at high speeds, said cutback valve means being in fluid communication with said throttle pressure signal source, the throttle pressure signal acting upon said cutback valve means to oppose the influence of said speed signal thereon thereby causing an increase in the speed at which the operating pressure level maintained by said regulator valve means is reduced during a period of acceleration of said driven member, the magnitude of said increase in speed being proportional to engine manifold pressure, said regulator valve means comprising a main regulator valve spool and a pressure booster valve situated in a common valve cavity in coaxial relationship, spring means situated between said booster valve and said main valve spool, the fluid pressure area formed in said valve spool in fluid communication with a high pressure region of said system thereby establishing a hydraulic force that opposes the force of said spring means, said booster valve having formed thereon a fluid pressure area that is in fluid communication with said first pressure signal source, the latter creating a pressure force on said booster valve that is opposed by said spring means whereby the pressure level in said system is not allowed to be reduced to a value less than a predetermined minimum when engine torque is less than a predetermined value.

14. In a control system for a hydrokinetic torque transmission mechanism for use in a driveline having an engine, a driven member, a fluid pressure source, fluid pressure operated servos, conduit structure interconnecting said source and said servos including fluid pressure distributor valve means for distributing selectively pressure from said source to said servos, a source of a first pressure signal that is sensitive to engine torque, a source of a second pressure signal that is sensitive to the driven speed of said driven member, said distributor valve means being subjected to said signals and actuated thereby, a pressure regulator valve means disposed in said conduit structure for maintaining a regulated pressure level in said system, means for distributing said first pressure signal to said regulator valve means to effect an increase in the regulated pressure level in said system when engine torque increases, said first pressure signal distributing means including a passage connecting said first pressure signal source and said regulator valve means, and cutback valve means disposed in and partly defining said connecting passage, said cutback valve means being in fluid communication with said second pressure signal source and being actuated upon an increase in the magnitude of said second pressure signal to block said connecting passage, said regulator valve means comprising a main regulator valve spool and a pressure booster valve situated in a common valve cavity in coaxial relationship, spring means situated between said booster valve and said main valve spool, the fluid pressure area formed in said valve spool in fluid communication with a high pressure region of said system thereby establishing a hydraulic force that opposes the force of said spring means, said booster valve having formed thereon a fluid pressure area that is in fluid communication with said first pressure signal source, the latter creating a pressure force on said booster valve that is opposed by said spring means whereby the pressure level in said system is not allowed to be reduced to a value less than a predetermined minimum when engine torque is less than a predetermined value.

15. In a control system for a hydrokinetic torque transmission mechanism for use in a driveline having an engine, a driven member, a fluid pressure source, fluid pressure operated servos, conduit structure interconnecting said source and said servos including fluid pressure distributor valve means for distributing selectively pressure from said source to said servos, a source of a first pressure signal that is sensitive to engine torque, a source of a second pressure signal that is sensitive to the driven speed of said driven member, said distributor valve means being subjected to said signals and actuated thereby, a pressure regulator valve means disposed in said conduit structure for maintaining a regulated pressure level in said system, means for distributing said first pressure signal to said regulator valve means to effect an increase in the regulated pressure level in said system when engine torque increases, and cutback valve means in fluid communication with said regulator valve means for changing the regulating characteristics of the latter, said cutback valve means including a movable valve element having opposed fluid pressure areas, one of said areas being subjected to said second pressure signal and the other area being subjected to said first pressure signal whereby increases in the magnitude of said first pressure signal delay the change in the operating pressure level maintained by said regulator valve means during a period of acceleration of said driven member, the magnitude of said delay being proportional to engine torque, said regulator valve means comprising a main regulator valve spool and a pressure booster valve situated in a common valve cavity in coaxial relationship, spring means situated between said booster valve and said main valve spool, the fluid pressure area formed in said valve spool in fluid communication with a high pressure region of said system thereby establishing a hydraulic force that opposes the force of said spring means, said booster valve having formed thereon a fluid pressure area that is in fluid communication with said first pressure signal source, the latter creating a pressure force on said booster valve that is opposed by said spring means whereby the pressure level in said system is not allowed to be reduced to a value less than a predetermined minimum when engine torque is less than a predetermined value.

16. In a control system for a hydrokinetic power transmission mechanism in an automotive vehicle driveline having an internal combustion engine with a carburetor throttle controlled air intake manifold, a driven member, a fluid pressure source drivably connected to said engine, gearing having gear elements that define plural torque delivery paths between said engine and said driven member, fluid pressure operated servos for controlling the relative motion of the elements of said gearing to establish speed ratio changes, conduit structure interconnecting said servos and said pressure source including fluid pressure distributor valve means for distributing selectively pressure from said source to said servos, a source of a throttle pressure signal that is proportional in magnitude to the pressure in said engine intake manifold, a source of a speed pressure signal that is proportional in magnitude to the driven speed of said driven member, said distributor valve means being subjected to said signals and actuated thereby, a pressure regulator valve means including a regulator valve element disposed in said conduit structure for maintaining a regulated pressure level in said system, first passage means for distributing said throttle pressure signal to said regulator valve means to effect an increase in the regulated pressure level in said system when the manifold pressure increases, second passage means for distributing said throttle pressure signal to said regulator valve means to supplement the effect of the throttle pressure signal in said first passage means, and cutback valve means in communication with said speed pressure signal source for interrupting distribution of throttle pressure signal through said second passage means upon an increase in the driven speed of said driven member to a value greater than a predetermined value thereby effecting a reduction in the operating pressure level maintained in the system for any given engine torque when said driven member is operated at high speeds.

17. In a control system for a hydrokinetic power transmission mechanism in an automotive vehicle driveline having an internal combustion engine with a carburetor throttle controlled air intake manifold, a driven member, a fluid pressure source drivably connected to said engine, gearing having gear elements that define plural torque delivery paths between said engine and said driven member, fluid pressure operated servos for controlling the relative motion of the elements of said gearing to establish speed ratio changes, conduit structure interconnecting said servos and said pressure source including fluid pressure distributor valve means for distributing selectively pressure from said source to said servos, a source of a throttle pressure signal that is proportional in magnitude to the pressure in said engine intake manifold, a source of a speed pressure signal that is proportional in magnitude to the driven speed of said driven member, said distributor valve means being subjected to said signals and actuated thereby, a pressure regulator valve means including a regulator valve element disposed in said conduit structure for maintaining a regulated pressure level in said system, first passage means for distributing said throttle pressure signal to said regulator valve means to effect an increase in the regulated pressure level in said system when the manifold pressure increases, second passage means for distributing said throttle pressure signal to said regulator valve means to supplement the effect of the throttle pressure signal in said first passage means, and cutback valve means in communication with said speed pressure signal source for interrupting distribution of throttle pressure signal through said second passage means upon an increase in the driven speed of said driven member to a value greater than a predetermined value thereby effecting a reduction in the operating pressure level maintained in the system for any given engine torque when said driven member is operated at high speeds, said cutback valve means being in fluid communication with said throttle pressure signal source, the throttle pressure signal acting upon said cutback valve means to oppose the influence of said speed signal thereon thereby causing an increase in the speed at which the operating pressure level maintained by said regulator valve means is reduced during a period of acceleration of said driven member, the magnitude of said increase in speed being proportional to engine manifold pressure.

18. In a control system for a hydrokinetic torque transmission mechanism for use in a driveline having an engine, a driven member, a fluid pressure source, fluid pressure operated servos, conduit structure interconnecting said source and said servos including fluid pressure distributor valve means for distributing selectively pressure from said source to said servos, a source of a first pressure signal that is sensitive to engine torque, a source of a second pressure signal that is sensitive to the driven speed of said driven member, said distributor valve means being subjected to said signals and actuated thereby, a pressure regulator valve means including a regulator valve element disposed in said conduit structure for maintaining a regulated pressure level in said system, connecting passage means for distributing said first pressure signal to said regulator valve means to effect an increase in the regulated pressure level in said system when engine torque increases, and cutback valve means disposed in and partly defining said connecting passage means, said cutback valve means being in fluid communication with said second pressure signal source and being actuated upon an increase in the magnitude of said second pressure signal to block said connecting passage.

19. In a control system for a hydrokinetic torque transmission mechanism for use in a driveline having an engine, a driven member, a fluid pressure source, fluid pressure operated servos, conduit structure interconnecting said source and said servos including fluid pressure distributor valve means for distributing selectively pressure from said source to said servos, a source of a first pressure signal that is sensitive to engine torque, a source of a second pressure signal that is sensitive to the driven speed of said driven member, said distributor valve means being subjected to said signals and actuated thereby, a pressure regulator valve means including a regulator valve element disposed in said conduit structure for maintaining a regulated pressure level in said system, means for distributing said first pressure signal to said regulator valve means to effect an increase in the regulated pressure level in said system when engine torque increases, and cutback valve means in fluid communication with said regulator valve means for changing the regulating characteristics of the latter, said cutback valve means including a movable valve element having opposed fluid pressure areas, one of said areas being subjected to said second pressure signal and the other area being subjected to said first pressure signal whereby increases in the magnitude of said first pressure signal delay the change in the operating pressure level maintained by said regulator valve means during a period of acceleration of said driven member, the magnitude of said delay being proportional to engine torque.

20. In a control system for a hydrokinetic torque transmission mechanism for use in a driveline having an engine, a driven member, a fluid pressure source, fluid pressure operated servos, conduit structure interconnecting said source and said servos including fluid pressure distributor valve means for distributing selectively pressure from said source to said servos, a source of a first pressure signal that is sensitive to engine torque, a source of a second pressure signal that is sensitive to the driven speed of said driven member, said distributor valve means being subjected to said signals and actuated thereby, a pressure regulator valve means including a regulator valve element disposed in said conduit structure for maintaining a regulated pressure level in said system, means for distributing said first pressure signal to said regulator valve means to effect an increase in the regulated pressure level in said system when engine torque increases, coasting boost valve means situated in and partly defining said first signal distributing means for augmenting said regulated pressure level during operation at high speeds and reduced torque, said coasting boost valve means being subjected to said second pressure signal, the pressure force established by said second pressure signal on said coasting boost valve means opposing the pressure force established thereon by said first pressure signal, said coasting boost valve means being in fluid commmunication with a high pressure portion of said system and adapted to establish communication between said regulator valve means and said high pressure portion when the magnitude of said first pressure signal is reduced and the magnitude of said second pressure signal is greater than a predetermined value.

21. In a control system for a hydrokinetic power transmission mechanism in an automotive vehicle driveline having an internal combustion engine with a carburetor throttle controlled air intake manifold, a driven member, a fluid pressure source drivably connected to said engine, gearing having gear elements that define plural torque delivery paths between said engine and said driven member, fluid pressure operated servos for controlling the relative motion of the elements of said gearing to establish speed ratio changes, conduit structure interconnecting said servos and said pressure source including fluid pressure distributor valve means for distributing selectively pressure from said source to said servos, a source of a throttle pressure signal that is proportional in magnitude to the pressure in said engine intake manifold, a source of a speed pressure signal that is proportional in magnitude to the driven speed of said driven member, said distributor valve means being subjected to said signals and actuated thereby, a pressure regulator valve means including a regulator valve element disposed in said conduit structure for maintaining a regulated pressure level in said system, first passage means for distributing said throttle pressure signal to said regulator valve means to effect an increase in the regulated pressure level in said system when the manifold pressure increases, second passage means for distributing said throttle pressure signal to said regulator valve means to supplement the effect of the throttle pressure signal in said first passage means, and cutback valve means in communication with said speed pressure signal source for interrupting distribution of throttle pressure signal through said second passage means upon an increase in the driven speed of said driven member to a value greater than a predetermined value thereby effecting a reduction in the operating pressure level maintained in the system for any given engine torque when said driven member is operated at high speeds, coasting boost valve means situated in and partly defining a hydraulic connection between said first pressure signal source and said regulator valve means, said coasting boost valve means being subjected to said speed pressure signal, the pressure force established by said speed pressure signal opposing the pressure force established by said throttle pressure signal, said coasting boost valve means being in fluid communication with a high pressure portion of said system and adapted to establish communication between said regulator valve means and said high pressure portion when the magnitude of said throttle pressure signal is reduced and the magnitude of said speed pressure signal is greater than a predetermined value.

22. In a control system for a hydrokinetic power transmission mechanism in an automotive vehicle driveline having an internal combustion engine with a carburetor throttle controlled air intake manifold, a driven member, a fluid pressure source drivably connected to said engine, gearing having gear elements that define plural torque delivery paths between said engine and said driven member, fluid pressure operated servos for controlling the relative motion of the elements of said gearing to establish speed ratio changes, conduit structure interconnecting said servos and said pressure source including fluid pressure distributor valve means for distributing selectively pressure from said source to said servos, a source of a throttle pressure signal that is proportional in magnitude to the pressure in said engine intake manifold, a source of a speed pressure signal that is proportional in magnitude to the driven speed of said driven member, said distributor valve means being subjected to said signals and actuated thereby, a pressure regulator valve means including a regulator valve element disposed in said conduit structure for maintaining a regulated pressure level in said system, first passage means for distributing said throttle pressure signal to said regulator valve means to effect an increase in the regulated pressure level in said system when the manifold pressure increases, second passage means for distributing said throttle pressure signal to said regulator valve means to supplement the effect of the throttle pressure signal in said first passage means, and cutback valve means in communication with said speed pressure signal source for interrupting distribution of throttle pressure signal through said second passage means upon an increase in the driven speed of said driven member to a value greater than a predetermined value thereby effecting a reduction in the operating pressure level maintained in the system for any given engine torque when said driven member is operated at high speeds, said cutback valve means being in fluid communication with said throttle pressure signal source, the throttle pressure signal acting upon said cutback valve means to oppose the influence of said speed signal thereon thereby causing an increase in the speed at which the operating pressure level maintained by said regulator valve means is reduced during a period of acceleration of said driven member, the magnitude of the delay being proportional to engine manifold pressure, coasting boost valve means situated in and partly defining a hydraulic connection between said first pressure signal source and regulator valve means, said coasting boost valve means being subjected to said speed pressure signal, the pressure force established by said speed pressure signal opposing the pressure force established by said throttle pressure signal, said coasting boost valve means being in fluid communication with a high pressure portion of said system and adapted to establish communication between said regulator valve means and said high pressure portion when the engine torque is reduced and the driven speed is high.

23. In a control system for a hydrokinetic torque transmission mechanism for use in a driveline having an engine, a driven member, a fluid pressure source, fluid pressure operated servos, conduit structure interconnecting said source and said servos including fluid pressure distributor valve means for distributing selectively pressure from said source to said servos, a source of a first pressure signal that is sensitive to engine torque, a source of a second pressure signal that is sensitive to the driven speed of said driven member, said distributor valve means being subjected to said signals and actuated thereby, a pressure regulator valve means including a regulator valve element disposed in said conduit structure for maintaining a regulated pressure level in said system, connecting passage means for distributing said first pressure signal to said regulator valve means to effect an increase in the regulated pressure level in said system when engine torque increases, said first pressure signal distributing means including a passage connecting said first pressure signal source and said regulator valve means, cutback valve means disposed in and partly defining said connecting passage means, said cutback valve means being in fluid communication with said second pressure signal source and being actuated upon an increase in the magnitude of said second pressure signal to interrupt the connection through said connecting passage, coasting boost valve means situated in and partly defining a hydraulic connection between said first pressure signal source and said regulator valve means, said coasting boost valve means being subjected to said second pressure signal, the pressure force established on said coasting boost valve means by said second pressure signal opposing the pressure force established thereon by said first pressure signal, said coasting boost valve means being in fluid communication with a high pressure portion of said system and adapted to establish communication between said regulator valve means and said high pressure portion when the torque is reduced and the speed is high.

24. In a control system for a hydrokinetic torque transmission mechanism for use in a driveline having an engine, a driven member, a fluid pressure source, fluid pressure operated servos, conduit structure interconnecting said source and said servos including fluid pressure distributor valve means for distributing selectively pressure from said source to said servos, a source of a first pressure signal that is sensitive to engine torque, a source of a second pressure signal that is sensitive to the driven speed of said driven member, said distributor valve means being subjected to said signals and actuated thereby, a pressure regulator valve means including a regulator valve element disposed in said conduit structure for maintaining a regulated pressure level in said system, means for distributing said first pressure signal to said regulator valve means to effect an increase in the regulated pressure level in said system when engine torque increases, and cutback valve means in fluid communication with said regulator valve means for changing the regulating characteristics of the latter, said cutback valve means including a movable valve element having opposed fluid pressure areas, one of said areas being subjected to said second pressure signal and the other area being subjected to said first pressure signal whereby increases in the magnitude of said first pressure signal delay the change in the operating pressure level maintained by said regulator valve means during a period of acceleration of said driven member, the magnitude of said delay being proportional to engine torque, coasting boost valve means situated in and partly defining a hydraulic connection between said first pressure signal source and said regulator valve means, said coasting boost valve means being subjected to said second pressure signal, the pressure force established on said coasting boost valve means by said second pressure signal opposing the pressure force established thereon by said first pressure signal, said coasting boost valve means being in fluid communication with a high pressure portion of said system and adapted to establish communication between said regulator valve means and said high pressure portion when the engine torque is low and the driven speed is high.

References Cited

UNITED STATES PATENTS

| | | | |
|---|---|---|---|
| 2,769,350 | 11/1956 | Lucia et al. | 74—472 |
| 2,821,095 | 1/1958 | Kelley | 74—645 |
| 2,855,803 | 10/1958 | Knowles | 74—677 |
| 2,875,643 | 3/1959 | Kelley | 74—645 |
| 2,912,876 | 11/1959 | Chapman et al. | 74—472 |
| 3,003,367 | 10/1961 | Winchell | 74—688 |
| 3,023,632 | 3/1962 | Flinn | 74—472 |
| 3,056,313 | 10/1962 | Lindsay | 74—752 |
| 3,108,493 | 10/1963 | Hause | 74—688 |
| 3,110,198 | 11/1963 | Borman | 74—688 |
| 3,117,464 | 1/1964 | Ivey | 74—472 |

DONLEY J. STOCKING, *Primary Examiner.*

DAVID J. WILLIAMOWSKY, *Examiner.*

J. R. BENEFIEL, *Assistant Examiner.*